United States Patent [19]

Katayama et al.

[11] Patent Number: 5,295,061

[45] Date of Patent: Mar. 15, 1994

[54] CONTROL PARAMETER TUNING UNIT AND A METHOD OF TUNING PARAMETERS FOR A CONTROL UNIT

[75] Inventors: Ryu Katayama; Yuji Kajitani, both of Osaka, Japan

[73] Assignee: Sanyo Electric Co., Ltd., Osaka, Japan

[21] Appl. No.: 688,057

[22] Filed: Apr. 19, 1991

[30] Foreign Application Priority Data

| Apr. 20, 1990 | [JP] | Japan | 2-106258 |
| Jul. 9, 1990 | [JP] | Japan | 2-181311 |
| Jul. 19, 1990 | [JP] | Japan | 2-191540 |
| Oct. 17, 1990 | [JP] | Japan | 2-279965 |
| Nov. 21, 1990 | [JP] | Japan | 2-319980 |

[51] Int. Cl.$^5$ .................................. G05B 13/02
[52] U.S. Cl. ......................... 364/157; 395/61; 395/900; 395/906
[58] Field of Search ............... 364/157; 395/61, 900, 395/3, 902, 903–906

[56] References Cited

U.S. PATENT DOCUMENTS

| 4,903,192 | 2/1990 | Saito et al. | 395/900 |
| 5,005,133 | 4/1991 | Takahashi | 395/900 |
| 5,012,430 | 4/1991 | Sakurai | 364/148 |
| 5,043,862 | 8/1991 | Takahashi | 395/900 |
| 5,051,932 | 9/1991 | Inoue et al. | 395/900 |
| 5,054,585 | 10/1991 | Amano | 187/124 |
| 5,159,547 | 10/1992 | Chand | 364/157 |
| 5,175,801 | 12/1992 | Iokibe | 395/61 |
| 5,179,634 | 1/1993 | Matsunaga et al. | 395/75 |
| 5,189,728 | 2/1993 | Yamakawa et al. | 395/51 |

FOREIGN PATENT DOCUMENTS 1-258003 10/1989 Japan .

OTHER PUBLICATIONS

"A Design of Self-Tuning Fuzzy Controller", 5th Fuzzy System Symposium (Kobe, Jun. 2–3, 1989).

Primary Examiner—Jerry Smith
Assistant Examiner—Jim Trammell
Attorney, Agent, or Firm—Darby & Darby

[57] ABSTRACT

A fuzzy control unit includes a fuzzy inference unit forming a manipulated variable for controlling a plant such that a control response from the plant is made equal to a previously set target value, based on fuzzy control knowledge. An automatic tuning unit corrects the fuzzy control rules in accordance with the control response from the plant. The automatic tuning unit includes a response waveform memory storing a control response value from the plant, a rule grade memory for storing grade values of the fuzzy control rules for the control response from the plant, an ideal waveform memory for storing ideal control response values to be attained by the plant under control by the fuzzy control unit, and a control evaluating circuit evaluating the control operation of the fuzzy control unit based on the ideal response value and the control response value. The automatic tuning unit also includes a circuit for correcting a membership function of a consequent portion of the fuzzy control rules in accordance with the amount of correction and the rule grade.

48 Claims, 18 Drawing Sheets

FIG. 2

| RULE No. | 1 | 2 | 3 | ... | n |
|---|---|---|---|---|---|
| j − s | 0.22 | 0.31 | 0.47 | ... | 0 |
| ... | ... | ... | ... | ... | ... |
| j − 2 | 0 | 0.25 | 0.36 | ... | 0.68 |
| j − 1 | 0 | 0.21 | 0.31 | ... | 0.70 |
| j | 0 | 0.14 | 0.21 | ... | 0.77 |

(SAMPLE TIME)

FIG. 3

| SAMPLE TIME | $y_k$ |
|---|---|
| j − s | $y_{j-s}$ |
| ... | ... |
| j − 2 | $y_{j-2}$ |
| j − 1 | $y_{j-1}$ |
| j | $y_j$ |

FIG. 4

| SAMPLE TIME | $y_k^\circ$ | $e_k^\circ$ |
|---|---|---|
| j − s | $y_{j-s}^\circ$ | $e_{j-s}^\circ$ |
| ... | ... | ... |
| j − 2 | $y_{j-2}^\circ$ | $e_{j-2}^\circ$ |
| j − 1 | $y_{j-1}^\circ$ | $e_{j-1}^\circ$ |
| j | $y_j^\circ$ | $e_j^\circ$ |

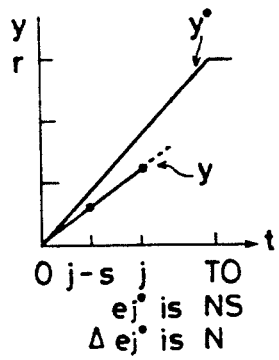

FIG 12D $ej^\bullet$ is NS
$\Delta ej^\bullet$ is N

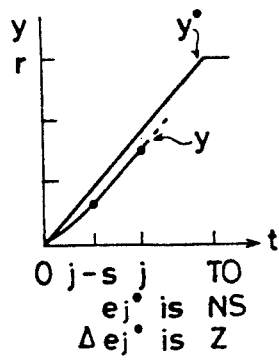

FIG. 12E $ej^\bullet$ is NS
$\Delta ej^\bullet$ is Z

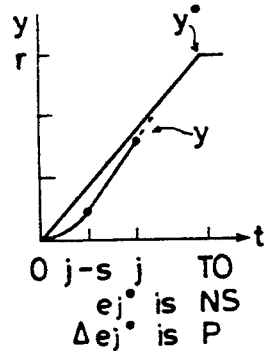

FIG. 12F $ej^\bullet$ is NS
$\Delta ej^\bullet$ is P

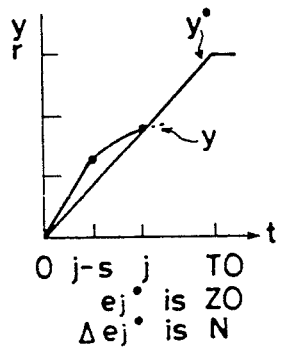

FIG. 12G $ej^\bullet$ is ZO
$\Delta ej^\bullet$ is N

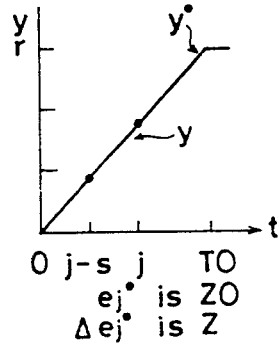

FIG. 12H $ej^\bullet$ is ZO
$\Delta ej^\bullet$ is Z

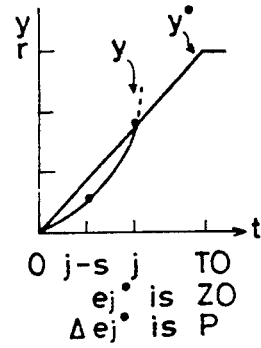

FIG. 12I $ej^\bullet$ is ZO
$\Delta ej^\bullet$ is P

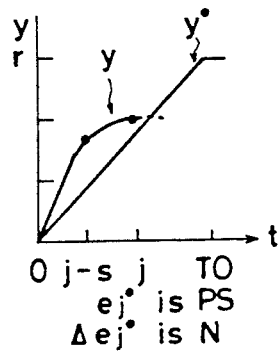

FIG. 12J $ej^\bullet$ is PS
$\Delta ej^\bullet$ is N

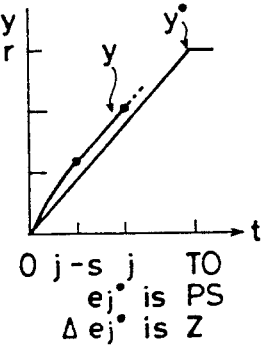

FIG. 12K $ej^\bullet$ is PS
$\Delta ej^\bullet$ is Z

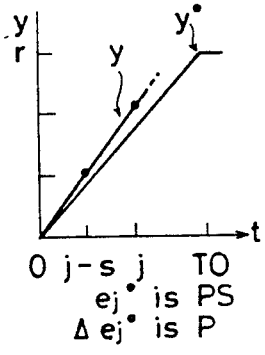

FIG. 12L $ej^\bullet$ is PS
$\Delta ej^\bullet$ is P

FIG. 12M
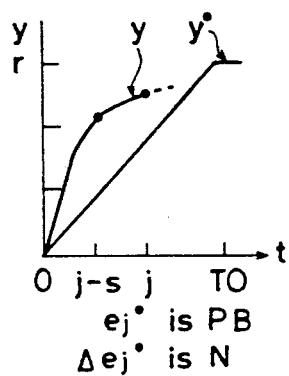
$e_j^\bullet$ is PB
$\Delta e_j^\bullet$ is N
FIG. 12N
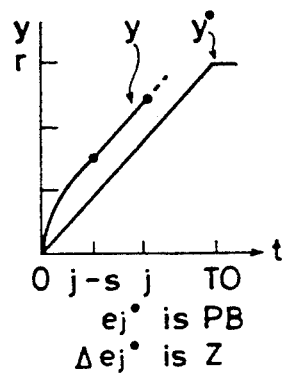
$e_j^\bullet$ is PB
$\Delta e_j^\bullet$ is Z
FIG. 12O
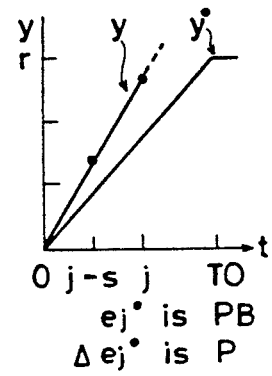
$e_j^\bullet$ is PB
$\Delta e_j^\bullet$ is P
FIG. 13
| $\Delta hi$ | | $\Delta e j^\bullet$ | | |
| --- | --- | --- | --- | --- |
| | | N | Z | P |
| $e j^\bullet$ | NB | PB | PM | PS |
| | NS | PM | PS | ZO |
| | ZO | PS | ZO | NS |
| | PS | ZO | NS | NM |
| | PB | NS | NM | NB |
FIG. 14
| $\Delta hi$ | | $\Delta e j^\bullet$ | | |
| --- | --- | --- | --- | --- |
| | | N | Z | P |
| $e j^\bullet$ | NB | PB | PM | PS |
| | NS | | PS | |
| | ZO | PS | ZO | NS |
| | PS | | NS | |
| | PB | NS | NM | NB |

FIG. 21
| CTRL TARGET | e | OV* | DP* | RT* |
|---|---|---|---|---|
| STABILITY NEAR TARGET VALUE MUCH CONSIDERED | $|e| \leq \delta_1$ | $OV_1^*$ | $DP_1^*$ | $RT_1^*$ |
| CONVERGENCE TO TARGET VALUE MUCH CONSIDERED | $\delta_1 < |e| \leq \delta_2$ | $OV_2^*$ | $DP_2^*$ | $RT_2^*$ |
| QUICK RESPONSE, TRANSIENT CHARACTERISTIC MUCH CONSIDERED | $\delta_2 < |e|$ | $OV_3^*$ | $DP_3^*$ | $RT_3^*$ |
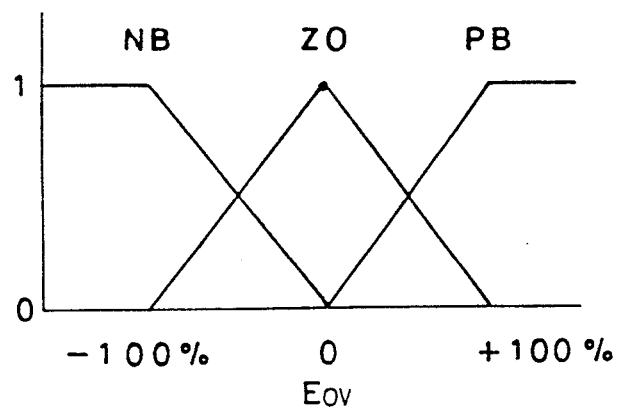
FIG. 22
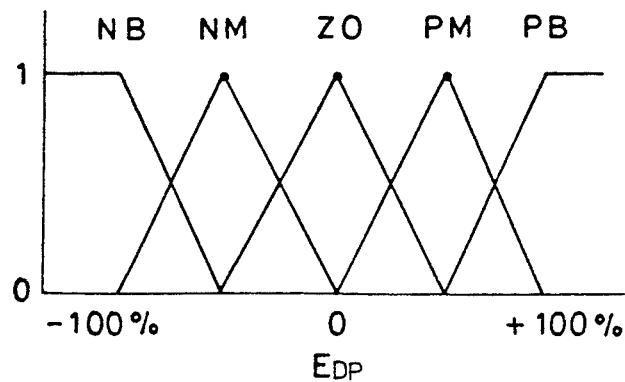
FIG. 23

FIG. 27

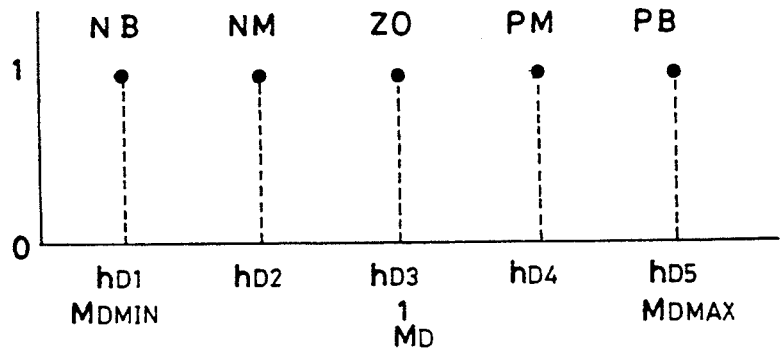

FIG. 28

| | ANTECEDENT VARIABLE | | | CONSEQUENT VARIABLE | | |
|---|---|---|---|---|---|---|
| | $E_{OV}$ | $E_{DP}$ | $E_{RT}$ | $M_P$ | $M_I$ | $M_D$ |
| RULE 1 | PB | PB | — | PB | PB | NB |
| RULE 2 | PB | PM | ZO | PB | PM | PB |
| --- | --- | --- | --- | --- | --- | --- |
| RULE m-1 | ZO | PM | ZO | ZO | PM | ZO |
| RULE m | ZO | ZO | ZO | ZO | ZO | ZO |

FIG. 29

| CTRL TARGET | e | P* | $T_I$* | $T_D$* |
|---|---|---|---|---|
| STABILITY NEAR TARGET VALUE MUCH CONSIDERED | $\|e\| \leq \delta_1$ | $P_1$* | $T_{I1}$* | $T_{D1}$* |
| CONVERGENCE TO TARGET VALUE MUCH CONSIDERED | $\delta_1 < \|e\| \leq \delta_2$ | $P_2$* | $T_{I2}$* | $T_{D2}$* |
| QUICK RESPONSE, TRANSIENT CHARACTERISTIC MUCH CONSIDERED | $\delta_2 < \|e\|$ | $P_3$* | $T_{I3}$* | $T_{D3}$* |

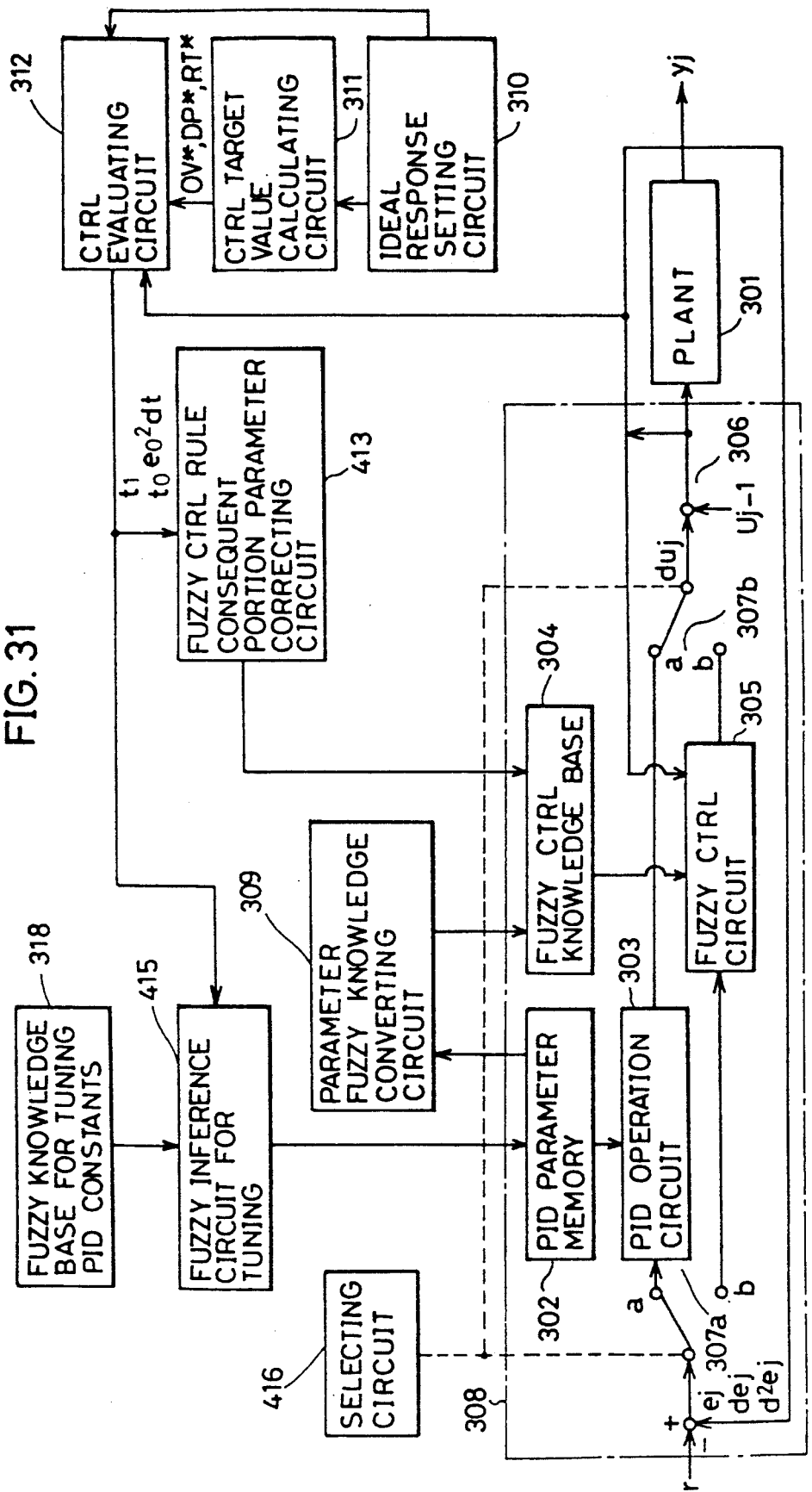

CONTROL PARAMETER TUNING UNIT AND A METHOD OF TUNING PARAMETERS FOR A CONTROL UNIT

BACKGROUND OF THE INVENTION

1. Field of the Invention

The present invention relates to a unit for automatically tuning control parameters used in an automatic control unit, and to a method of tuning the same. More specifically, the present invention relates to a unit and method for optimizing fuzzy knowledge used in a fuzzy control unit. The present invention also relates to a unit and a method for optimizing PID parameters of a PID (Proportional, Integral, Differential) control unit.

2. Description of the Background Art

Various automatic control units have been used for automatically setting plants under control to desired states. A control unit utilizing a method of control called fuzzy control has been known as one of such control units.

In fuzzy control, a plant is controlled by finding an optimal manipulated variable by an arithmetic operation (fuzzy inference) for the plant under control, from, for example, control (response) deviation and difference (differential) information thereof, based on fuzzy knowledge including membership functions and fuzzy control rules.

Since a manipulated variable is calculated based on fuzzy inference, non-linear and variable control gain, which could not be provided in the conventional P (Proportional), I (Integral) and D (Differential) control, can be realized, enabling highly precise control. Therefore, fuzzy control is widely applied to various and many control systems.

In order to realize satisfactory fuzzy control, it is necessary to construct fuzzy knowledge suitable for a specific plant.

Various constructions providing optimal fuzzy knowledge by tuning fuzzy control rules depending on the given plant have been proposed. One example of such a fuzzy control unit having the automatic tuning function is disclosed in "A design of self-tuning fuzzy controller", M. Maeda et al, Proceedings of 5th Fuzzy System Symposium, June 1989, pp. 89 to 94.

In the fuzzy control unit of Maeda et al, control deviation, primary difference (derivative) of the control deviation and secondary difference of the control deviation are used as variables (input variables) of an antecedent portion, and a primary difference of manipulated variable is used as a consequent variable. Each of the three antecedent variables is divided into three portions labeled with fuzzy labels N (Negative), Z (Zero) and P (Positive). The consequent variable is divided into seven portions, and a membership function corresponding to each fuzzy label is represented by one real number.

In the above described fuzzy control unit of Maeda et al., tuning of the fuzzy control rule is executed in two stages.

In the first stage, scaling factors are adjusted for normalizing range of input/output value of the control unit within $[-1, 1]$. Control response is made approaching to a target response by adjusting the scaling factors. While the scaling factors are adjusted, deviations between target values and desired values of overshoot, reaching time and amplitude are used as input variables, utilizing the fact that the fuzzy control unit is similar to a PID control unit, and the amount of correcting the scaling factors are found by simplified fuzzy inference.

In the second stage, values of the consequent portion of the fuzzy control rules (the membership function of the consequent portion is represented by one real number for simplified fuzzy inference) are corrected in real time, that is, at the sample time when the control response is observed. By this correction of rules, the control response is made close to the target response.

In the above described automatic tuning of the fuzzy control rules, when the real number of the conclusion portion (consequent portion) is corrected basically, a response deviation, which is a difference between ideal response waveform and control response waveform at a time of sampling, and an amount of change between the present response deviation and a response deviation of a prescribed preceding sample time are used as input variables, the real number (membership function) of the consequent portion of the fuzzy control rules are corrected only by whether each of these variables is positive, negative or zero. However, a final amount of correction is provided by multiplying the basic amount of correction and a grade of each fuzzy control rule. Therefore, in this automatic tuning method, the consequent portion of the fuzzy control rules can not be corrected finely corresponding to the magnitude of the response deviation and/or amount of change of the response deviation.

Therefore, if an ideal response waveform is much different from an control response waveform based on the fuzzy control rules before correction, the convergence efficiency in tuning is not always satisfactory, and accordingly, a desired result of tuning may not be provided, or the tuning takes substantial time.

In order to correct fuzzy knowledge, it is necessary to construct an initial fuzzy knowledge base beforehand, as starting rules for the correcting operation. Conventionally, a designer has constructed such knowledge base by dividing input variables appropriately for generating suitable fuzzy labels and taking in consideration initial values of the membership functions and the fuzzy rules. However, it is very difficult to create totally a new fuzzy knowledge base where no knowledge on the plant is acquired.

If improper initial values (rules), which cause a large difference between an ideal response waveform and an control response waveform based on the fuzzy control rules, are set as the initial fuzzy knowledge, sufficient convergence of the control action can not be ensured, and it may be impossible to obtain good control action. If such an improper initial fuzzy knowledge base is set, a desired tuning effect can not be provided.

In the above mentioned prior art article, similarity between a fuzzy control unit and a PID control unit is utilized to correct the scaling factor.

In a PID control unit, a manipulated variable is calculated by effecting proportional action (P), integral operation (I) and derivative action (D) based on the control response. Parameters (PID parameters) used in the PID action are, in most cases, set based on experience and/or intuition of an expert. When setting of PID parameters are carried out manually, an operator tunes the PID parameters every time the process is raised up (when it is initially activated) and when process characteristic is changed. This causes differences in control states due to variations in tuning, and the task of tuning itself becomes a burden.

In view of the foregoing, an automatic tuning unit for automatically tuning PID parameters to appropriate values according to the control response has been proposed, as disclosed in, for example, Japanese Patent Laying-Open No. 1-258003.

The prior art automatic tuning unit includes a first determining portion determining a PID parameter taking substantial account of a transient response characteristic; a second determining portion determining the PID parameter taking substantially account of an attenuation (dumping) response characteristic; a deciding unit deciding whether a control deviation is derived from a change of a set value or derived from an external disturbance or a process characteristic change; and a selecting circuit for selecting either the PID parameter from the first determining portion or the PID parameter from the second determining portion in accordance with the decision of the deciding unit.

The first and second determining portions tune the PID parameters, independently. When the control deviation is derived from a change of a set value, the PID parameter is tuned taking account of the transient response characteristic by the first determining portion. When the control deviation is derived from a transient response or a change in process characteristic, the PID parameter is tuned taking account of the attenuation characteristic by the second determining portion. Tuning of the PID parameters is effected by fuzzy inference.

In this case, knowledge bases corresponding to respective methods of tuning, that is, a knowledge base for carrying out tuning taking account of the transient response characteristic, and a knowledge base to carry out tuning taking account of the attenuation characteristic are necessary.

In the PID control, target values of evaluation reference of control (hereafter referred to as control target values) such as 2% of overshoot amount, 5% of amplitude attenuation ratio (dumping ratio) are set in advance, separately and independently from the set values. The knowledge bases for tuning are formed to attain the control target values.

Therefore, when a different plant is to be controlled, or when, even if the plant is the same, the process characteristic is changed, the PID parameters can not be tuned in accordance with the changed control target value by using the tuning knowledge base formed for the previously set control target value.

In order to tune the PID parameters according to different control target values, tuning knowledge bases must be provided corresponding to respective control target values. Generally, plural values are set for one control target value (for example, an amount of overshoot). Therefore, the number of necessary tuning knowledge bases is the number of combinations of various control target values.

However, it is very difficult to prepare tuning knowledge bases corresponding to all combinations of control target values and it requires much time and labor.

Even if such tuning knowledge bases are formed, there must be a memory device having a very large capacity to store the tuning knowledge bases, which increases the scale of the device as well as the cost thereof.

OBJECTS OF THE INVENTION

An object of the present invention is to provide an automatic control parameter tuning unit which can automatically tune control parameters precisely.

Another object of the present invention is to provide an automatic fuzzy control rule tuning unit which can automatically tune fuzzy control rules precisely.

A further object of the present invention is to provide a fuzzy control unit in which formation of initial fuzzy control rules and precise tuning of the initial fuzzy control rules can be done fully automatically.

A still further object of the present invention is to provide a unit capable of automatically generating knowledge bases for fuzzy control, realizing satisfactory control.

A still further object of the present invention is to provide a control parameter tuning unit in which PID parameters can be tuned to optimal values even if target values of control are made different.

A still further object of the present invention is to provide a method of tuning control parameters to optimal values in accordance with control responses.

A still further object of the present invention is to provide a method for precisely adjusting fuzzy knowledge according to the control response.

SUMMARY OF THE INVENTION

The automatic control parameter tuning unit in accordance with the present invention is provided for a fuzzy control unit including (1) a fuzzy control knowledge base storing fuzzy control knowledge including membership functions and fuzzy control rules, and (2) a fuzzy control circuit for controlling a plant under control such that a control response value of the plant is brought to a previously set target value based on the fuzzy control knowledge, and it corrects the fuzzy control rules in the fuzzy control knowledge.

The automatic control parameter tuning unit in accordance with a first aspect comprises: a control response value storing unit storing the control response value from the plant under control; a rule grade storing unit storing the grade of the fuzzy control rules with respect to the control response value; an ideal response value storing unit storing an ideal control response value which is to be achieved by the plant; and a correcting unit including a fuzzy inference unit based on the control response value from the plant, the ideal response value and on the rule grade to correct the membership functions in the consequent portion of the fuzzy control rule.

The correcting unit comprises a unit for storing fuzzy knowledge for tuning for correcting the consequent portion of the fuzzy control rules based on a magnitude of the difference between the ideal response value and the control response value from the plant under control; and a fuzzy inference unit for tuning for correcting the membership functions of the consequent portion of the fuzzy control rules based on the ideal response value, the control response value from the plant under control and the related rules' grade, in accordance with the fuzzy knowledge for tuning.

An automatic tuning unit in accordance with a second aspect comprises a unit for storing ideal response of the plant under control, and a correcting unit for correcting the membership functions of the consequent portion of the fuzzy control rules in the fuzzy control knowledge base in accordance with a simplex method, based on the control response from the plant under control and on the ideal response.

Accordingly, by the automatic tuning unit, very fine correction of the fuzzy control rules according to how the control response waveform from the plant under control is different from the ideal waveform, and therefore a precisely optimized fuzzy control knowledge base is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 shows an example of stored content in a rule grade storing table shown in FIG. 1.

FIG. 3 shows an example of stored content in a response waveform storing table shown in FIG. 1.

FIG. 4 shows an example of stored content in an ideal response waveform table shown in FIG. 1.

FIG. 13 shows, in a table, fuzzy control rules for tuning corresponding to respective generations of the control response shown in FIGS. 12A to 12O.

FIG. 14 shows another example of the fuzzy control rules for tuning shown in FIG. 13.

FIG. 21 shows an example of stored contents in a control target value storing circuit shown in FIG. 19.

FIG. 22 shows, as an example, the membership function and fuzzy division of input variable $E_{OV}$ of the fuzzy knowledge stored in the knowledge base for tuning shown in FIG. 19.

FIG. 23 shows, as an example, the membership function and the fuzzy division for an input variable $E_{DP}$ of the fuzzy knowledge stored in the fuzzy knowledge base for tuning shown in FIG. 19.

FIG. 27 shows examples of the membership function and the fuzzy division with respect to a differential parameter $M_D$ in a fuzzy knowledge stored in the fuzzy knowledge base shown in FIG. 19.

FIG. 28 shows, in a table, fuzzy rules in the fuzzy knowledge stored in the fuzzy knowledge base shown in FIG. 19.

FIG. 29 shows an example of stored content of PID constant storage unit shown in FIG. 19.

FIG. 31 schematically shows a whole structure of a fuzzy control unit including a fuzzy control knowledge base constructing unit in accordance with a still further embodiment of the present invention.

DESCRIPTION OF THE PREFERRED EMBODIMENTS

Figure 1:
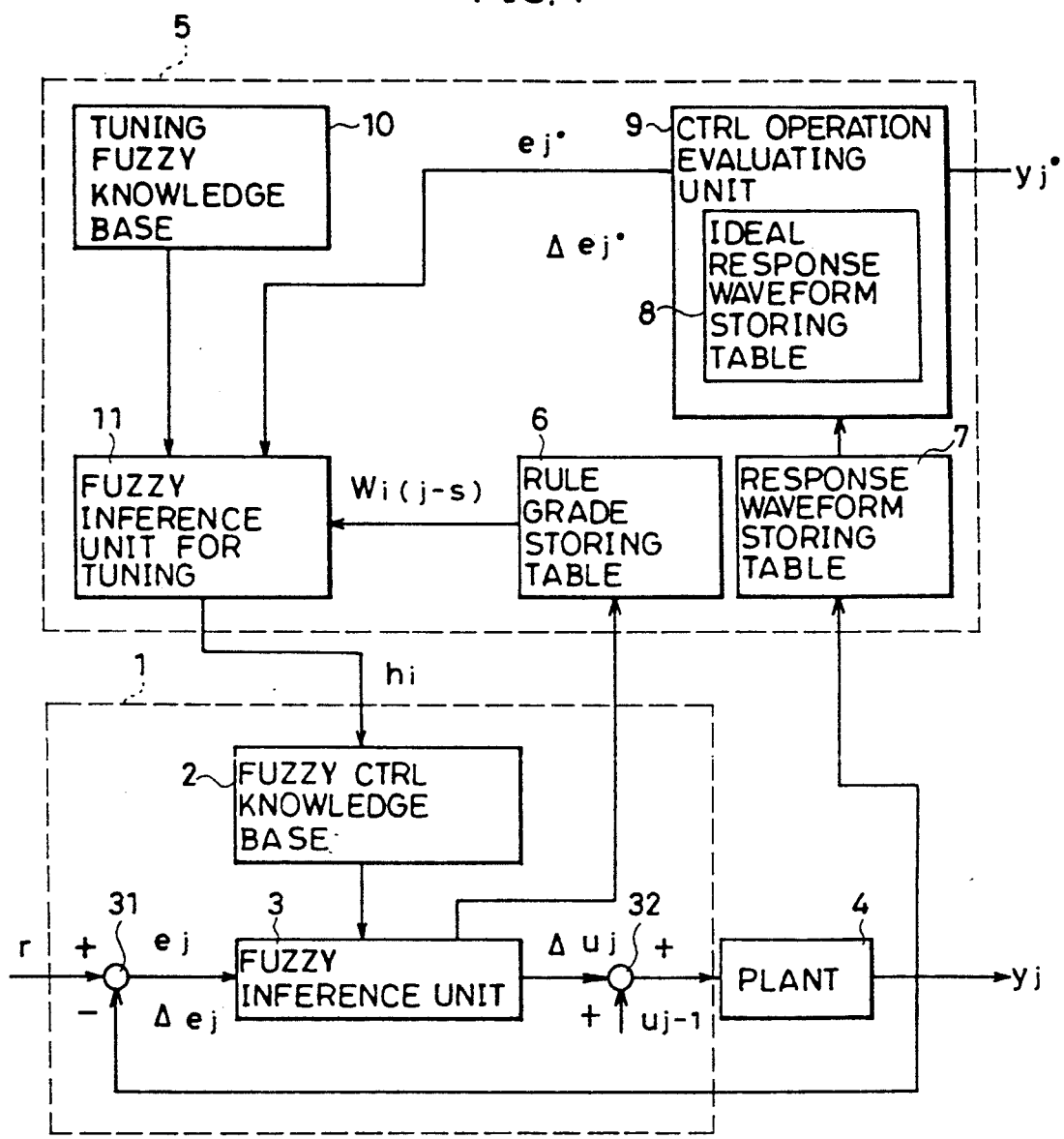
FIG. 1 is a block diagram schematically showing a whole structure of a fuzzy control unit including an automatic fuzzy knowledge tuning unit in accordance with one embodiment of the present invention.

FIG. 1 shows an automatic fuzzy control rule tuning unit 5 which is one embodiment of the present invention, and a fuzzy control unit 1 which is the object of tuning.

The fuzzy control unit 1 comprises a fuzzy control knowledge base 2 storing fuzzy control rules and membership functions; and a fuzzy inference unit 3 effecting inference based on the fuzzy control rules and the membership functions stored in the fuzzy control knowledge base 2.

A calculator 31 for generating input variables $e_j$, $\Delta e_j$ and the like from a target value r and a controlled variable 4 of the plant 4 under control is provided in a preceding stage of the fuzzy inference unit 3, a calculator 32 for generating a manipulated variable $u_j$ at the present time from a control output $\Delta u_j$ from the fuzzy inference unit 3 and on the manipulated variable $u_{j-1}$ at the last sampling.

The plant under control 4 makes a control action in accordance with the manipulated variable $u_j$ from the calculator 32, and outputs a controlled variable $y_j$ corresponding to the received manipulated variable $u_j$.

The calculator 31 generates a control deviation $e_j$ and a primary derivative (difference) $\Delta e_j$ of the control deviation $e_j$, from the set value r and the control response (controlled variable) $y_j$ at a present sample time point j. The control deviation $e_j$ and the primary difference thereof are given in accordance with the following equations:

$$\left.\begin{aligned} e_j &= r - y_j, \\ \Delta e_j &= e_j - e_{j-1} \end{aligned}\right\} \quad (1)$$

where $e_{j-1}$ represents control deviation at a sample time (j−1), and $y_j$ represents a controlled variable at the sample time j.

The fuzzy inference unit 3 calculates a primary difference $\Delta u_j$ of the manipulated variable based on the membership functions and the fuzzy control rules stored in the fuzzy knowledge base 2, using the control deviation $e_j$ and the primary difference $\Delta e_j$ thereof as input variables.

The calculator 32 adds the primary difference $\Delta u_j$ to the last manipulated variable $u_{j-1}$ from the fuzzy inference unit 3 to provide the manipulate variable $u_j$ at this time, and applies the same to the plant 4 under control. The manipulated variable $u_j$ at this time is given by the following equation:

$$u_j = u_{j-1} + u_j \quad (2)$$

The automatic tuning unit 5 carries out automatic tuning of the fuzzy control rules stored in the fuzzy control knowledge base in the fuzzy control unit 1.

The automatic tuning unit 5 comprises a fuzzy control rule grade storing table 6 storing, in a table, grades of fuzzy control rules calculated during the inference by the fuzzy inference unit 3, and a response waveform storing table 7 storing, in a table, the control response values $y_k$ from the object 4 under control.

The fuzzy control rule grade storing table 6 stores, as examples of the stored contents are shown in FIG. 2, the grades of respective fuzzy control rules corresponding to the control responses $y_k$ at respective sampling times k (k=j−s to j) from the present sample time j to the sample time (j−s) of the past. FIG. 2 shows, as an example, the stored contents in the fuzzy control rule grade storing table, where there are n fuzzy control rules.

The response waveform storing table 7 stores, as examples of the stored contents are shown in FIG. 3, the control responses $y_k$ from the plant 4 under control at each respective sample time k from the present sample time j to the sample time (j−s) in the past, corresponding to the respective sample times.

Now, returning to FIG. 1, the automatic tuning unit 5 further comprises a control operation evaluating unit 9 evaluating whether or not the control in the fuzzy control unit 1 is near the ideal state, based on the control response values stored in the response waveform storing table 7. The control operation evaluating unit 9 includes an ideal response waveform storing table 8 storing an ideal response value $y_k^0$ in fuzzy control with respect to the plant 4 under control.

The ideal response waveform storing table 8 stores, in a table, ideal response values $y_k^0$ at respective sample times, as examples of the stored content shown in FIG. 4. In FIG. 4, ideal response values $y_k^0$ at sample times j to (j−s) are shown for simplicity. Ideal response values $y_k^0$ at respective sample times from the start of the control until at least a lapse of a settling time are stored therein. Response deviation $e_k^0$ ($=y_k-y_k^0$) is also shown in FIG. 4.

Returning to FIG. 1, the control operation evaluating unit 9 includes, although not shown explicitly, an arithmetic operation control unit for calculating a response deviation $e_j^0$ and a primary difference $\Delta e_j^0$ of the response deviation from the ideal response values stored in the ideal response waveform storing table 8 and from the actual control response values stored in the response waveform storing table 7. The response deviation $e_j^0$ and the primary difference of the response deviation are given by the following equations:

$$\left.\begin{aligned} e_j^0 &= y_j - y_j^0 \\ \Delta e_j^0 &= e_j^0 - e_{j-s}^0 \end{aligned}\right\} \quad (3)$$

where $e_{j-s}^0$ represents response deviation at a sample time (j−s) preceding by s sample times to the present sample time j.

The automatic tuning unit 5 further comprises a tuning fuzzy knowledge base 10 storing fuzzy knowledge (fuzzy control rules and the membership functions) for tuning for correcting values of a consequent portion of a fuzzy control rules (membership functions) stored in the fuzzy control knowledge base 2, and a tuning inference unit 11 for correcting the consequent portion (membership function) of the fuzzy control rules stored in the fuzzy control knowledge base 2, based on the fuzzy knowledge stored in the tuning fuzzy knowledge base 10 and on the rule grades stored in the rule grade storing table 6, by using the response deviation $e_j^0$ and the primary difference $\Delta e_j^0$ from the control operation evaluating unit 9 as input variables.

The ideal response waveform storing table 8 may be provided outside the control operation evaluating unit 9, and the control operation evaluating unit 9 may comprise only the arithmetic operation control unit calculating the response deviation $e_j^0$ and the primary difference $\Delta_j^0$. Although a circuit for writing/reading to and from the respective tables 6, 7 and 8 and the knowledge bases 2 and 10 is not shown, the writing/reading of data is done in the similar manner as in a common processor unit. The operation will be described in the following.

First, operation of the fuzzy control unit 1 will be described. For the simplicity of description, it is assumed that a simplified fuzzy inference having a consequent portion being a real number is used in the fuzzy control rules, which rule govern the inference operation of the fuzzy control unit 1.

In the fuzzy control rule, the control deviation $e_j$ and the primary difference $\Delta e_j$ of the control deviation are used as antecedent portion variables, and a primary difference $\Delta u_j$ of the manipulated variable is used as a consequent portion variable.

The arrangement of fuzzy division of the control deviation $e_j$ and the primary difference $\Delta e_j$ of the control deviation are arbitrary. In this case, a fuzzy division of effecting division into seven labels is applied to both variables. The seven labels comprise NB (Negative Big), NM (Negative Medium), NS (Negative Small), ZO (Zero), PS (Positive Small), PM (Positive Medium) and PB (Positive Big).

Figures 5, 6:
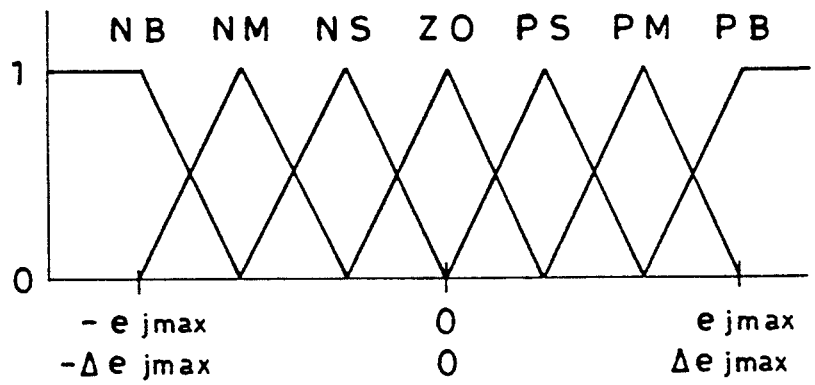
FIG. 5 shows, as an example, a membership function and fuzzy division of an antecedent portion of a fuzzy control rule stored in the fuzzy control knowledge base shown in FIG. 1.
FIG. 6 shows, in a table, fuzzy control rules of the fuzzy control knowledge base shown in FIG. 1.

In FIG. 5, $e_{jmax}$ and $-e_{jmax}$ represent the maximum value and the minimum value of the control deviation $e_j$, respectively. $\Delta e_{jmax}$ and $-\Delta e_{jmax}$ represent the maximum value and the minimum value of the primary difference $\Delta e_j$ of the control deviation. The range of the membership value (degree of satisfaction of the fuzzy control rule) is [0, 1], as in a conventional common membership function.

In accordance with the fuzzy division shown in FIG. 5, 13 fuzzy control rules as shown in FIG. 6 are set as an example. Other rules may be added to the blank portions #1 to #4 of the table of FIG. 6, increasing the number of fuzzy control rules.

The fuzzy control rules shown in FIG. 6 are represented as follows.

| rule 1: | IF $e_j$ is NB, and $\Delta e_j$ is ZO, THEN $\Delta u_j$ is NB. |
| rule 2: | IF $e_j$ is NM, and $\Delta e_j$ is ZO, THEN $\Delta u_j$ is NM. |
| rule 3: | IF $e_j$ is NS, and $\Delta e_j$ is ZO, THEN $\Delta u_j$ is NS. |
| rule 4: | IF $e_j$ is ZO, and $\Delta e_j$ is NB, THEN $\Delta u_j$ is NB. |
| rule 11: | IF $e_j$ is PS, and $\Delta e_j$ is ZO, THEN $\Delta u_j$ is PS. |
| rule 12: | IF $e_j$ is PM, and $\Delta e_j$ is ZO, THEN $\Delta u_j$ is PM. |
| rule 13: | IF $e_j$ is PB, and $\Delta e_j$ is ZO, THEN $\Delta u_j$ is PB. |

Figure 7:
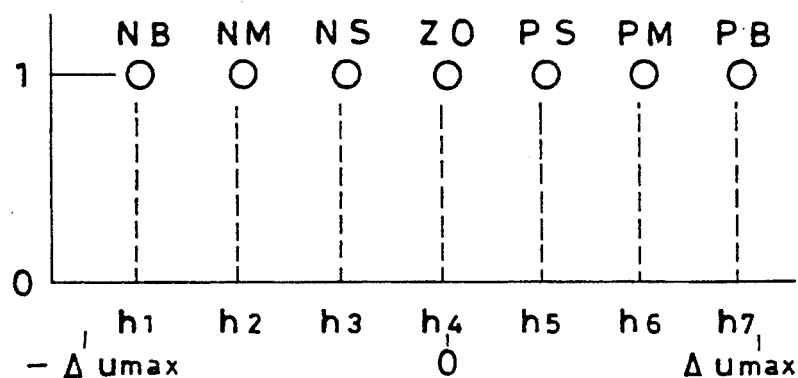
FIG. 7 shows, as an example, the membership function and the fuzzy division in the consequent portion of the fuzzy control rule of the fuzzy control knowledge base shown in FIG. 1.

The functions shown in FIG. 5 described above are used as the membership functions of the antecedent portion, while functions shown in FIG. 7 are used as the membership functions of the consequent portion.

Referring to FIG. 7, since a simplified fuzzy inference is used, each membership function of the consequence portion is represented by one real number hi (i=1 to 7). For example, the membership function with respect to the label PS is represented by a real number h5. In FIG. 7, $\Delta u_{max}$ and $-\Delta u_{max}$ represent the maximum value and the minimum value of the primary difference of the manipulated variable, respectively.

When the fuzzy inference unit 3 receives inputs $e_j$ and $\Delta e_j$, it calculates an output $u_j$ in accordance with the following equation (4) based on the above mentioned fuzzy knowledge (fuzzy control rules and the membership functions) stored in the fuzzy knowledge base 2, and applies the output to the calculator 32:

$$\Delta u_j = \sum_{i=1}^{n} W_i \cdot h_i / \sum_{i=1}^{n} W_i \quad (4)$$

where Wi represents the grade of an i-th fuzzy control rule with respect to the inputs $e_j$ and $\Delta e_j$. The grade $W_i$ is provided by the following equation.

$$W_i = MIN\{f_i(e_j), g_i(\Delta e_j)\} \quad (5),$$

or $$W_i = f_i(e_j) \times g_i(\Delta e_j) \quad (5')$$

In the equations (5) and (5'), fi and gi represent membership functions with respect to the inputs $e_j$ and $e_j$ of the i-th rule, respectively, and MIN{,} represents an MIN calculation in which smaller one of membership values $f_i(e_j)$ and $g_i(\Delta e_j)$ is taken. There are various proposed methods of synthesizing the grades of respective rules of the antecedent portions of Fuzzy control rules, the equation (5) is for MIN operation method, and the equation (5') is for algebraic multiplication method. Any synthesizing method may be employed.

The calculator 32 adds an output from the fuzzy inference unit 3, that is, the primary difference $\Delta u_j$ of the manipulated variable to the manipulated variable $u_{j-1}$ as the last sample time to find the manipulated variable $u_j$ at present, and applies the same to the plant 4. The plant 4 under control carries out control action in accordance with the applied manipulated variable $u_j$ and outputs a corresponding controlled variable $y_j$.

In FIG. 1, although the manipulated variable $u_{j-1}$ at the last sample time (j−1) is shown to be applied through a different path to the calculator 32, the calculator 32 may include a register storing the last manipulated variable $u_{j-1}$. Alternatively, a register storing the manipulated variable $u_{j-1}$ may be provided outside the calculator 32. In either case, the content of the register is replaced by the new manipulated variable $u_j$.

The controlled variable $y_j$ of the plant 4 is fed back to the calculator 31. The calculator 31 calculates the control deviation $e_j$ and the primary difference $\Delta e_j$ in accordance with the equation (1) from the target value (set value) r and the fedback controlled variable $y_j$. Thereafter, the above described operations are repeated. Next, tuning of the fuzzy control rules stored in the fuzzy knowledge base 2 will be described.

It is a final object of the automatic tuning unit 5 to correct the membership function (real number hi) of the consequent portion of the fuzzy control rules stored in the fuzzy knowledge base 2 such that a controlled variable (control response) $y_j$ at the present sample time j becomes the same as the corresponding ideal response $y_j^0$ stored in the ideal response waveform storing table 8.

Let us assume that the state of control at the sample time (j−s), preceding by s sample times to the present sample time j, influences the control state at the present sample time j. By correcting the real number in the consequent portion of the fuzzy control rules used at the sample time (j−s), the real number of the fuzzy control rule consequent portion at the present sample time j is calculated. The amount of correction in value of the real number is calculated by fuzzy inference based on the response deviation $e_j^0$, an amount of change (primary difference) $\Delta e_j^0$ of the response deviation during s samples and on the signs thereof.

Figure 8:
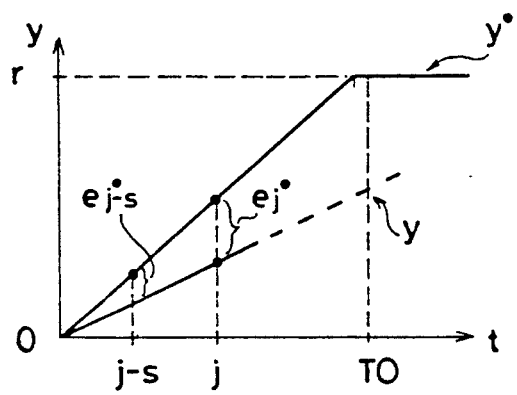
FIG. 8 shows an example of the relation between the ideal response and the control response from the plant under control shown in FIG. 1.

Assume a control response waveform y as shown in FIG. 8. The ideal response waveform is represented by a polygonal line $y^0$, which reaches the set value r at a sample time T0.

In FIG. 8, the response deviation $e_j^0 (=y_j-y_j^0)$ at the present sample time j has a negative sign, and it is further reduced from the response deviation $e_{j-s}^0$ at the sample time j−s. This state of control shows that the control response is going away from the ideal response value to a smaller value. The reason for this is that the manipulated variable $u_{j-s}$ before s samples was too small. Namely, it signifies that it was necessary to increase the value (membership function) of the consequent portion of the fuzzy control rule used before s samples. Therefore, the amount of correction for the value of the consequent portion of the fuzzy control rule before s samples is calculated by fuzzy inference, and the value of the consequent portion of the fuzzy control rule at the present sample time j is corrected in accordance with the calculated amount of correction.

This method of correction represented by a fuzzy rule for tuning is as follows.

IF $e_j^0$ is NB, and $\Delta e_j^0$ is N, THEN $\Delta h_i$ is PB

The label NB is allotted to the deviation $e_j^0$ here. In addition, $\Delta e_j^0 = e_j^0 - e_{j-s}^0 < 0$ (see equation (3)). Further, $\Delta h_i$ represents the amount of correction in value of the real number of consequent portion of an i-th fuzzy control rule.

The fuzzy knowledge for tuning described above is stored in the fuzzy knowledge base 10. The method of fuzzy division of the antecedent portion and the consequent portion of the fuzzy control rules for tuning is arbitrary. One example of fuzzy division with respect to the response deviation $e_j^0$ is shown in FIG. 9, and an example of fuzzy division with respect to a primary difference (amount of change of the response deviation in s samples) of the response deviation is shown in FIG. 10.

Figure 9:
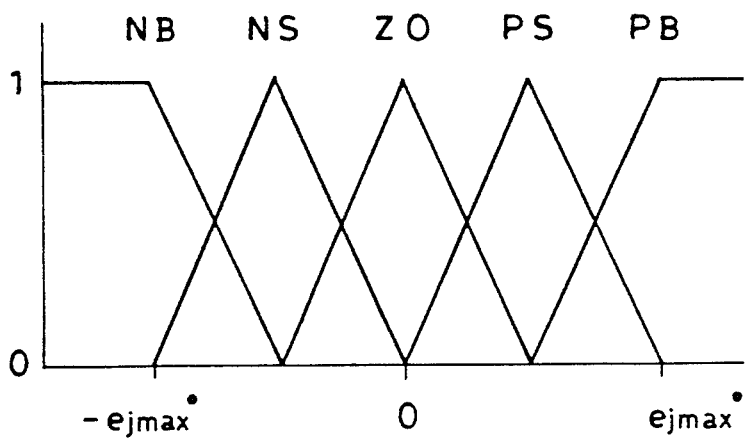
FIG. 9 shows an example of the membership function and the fuzzy division of the antecedent portion with respect to response deviation, of the fuzzy knowledge base for tuning shown in FIG. 1.
Figure 10:
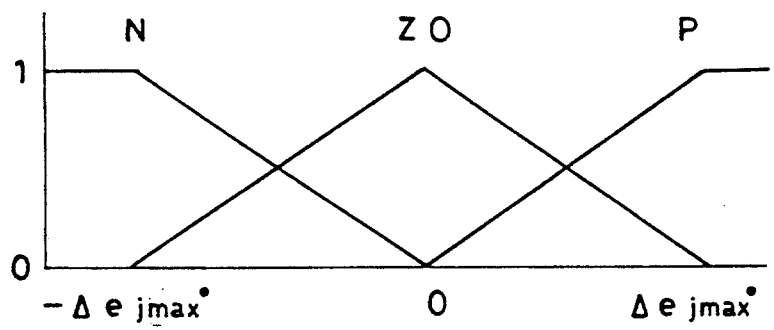
FIG. 10 shows, as an example, the membership function and the fuzzy division of the antecedent portion with respect to a primary difference of the response deviation of the fuzzy knowledge base for tuning shown in FIG. 1.

Referring to FIG. 9, fuzzy division with respect to the response deviation $e_j^0$ comprises 5 labels, that is, NB, NS, ZO, PS, and PB, while the fuzzy division with respect to the primary difference $\Delta e_j^0$ comprises three labels, that is, N (negative), Z (Zero) and P (Positive).

Figure 11:
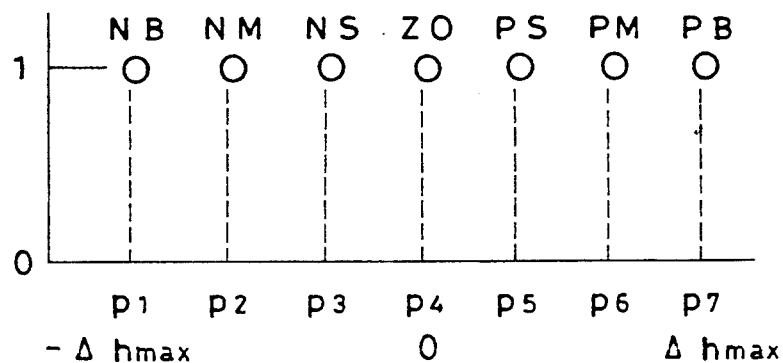
FIG. 11 shows, as an example, the membership function and the fuzzy division in the consequent portion of the fuzzy knowledge base for tuning shown in FIG. 1.

The membership functions with respect to the amount of correction $\Delta h_i$ at the consequent portions of the fuzzy control rules for tuning are shown in FIG. 11. Since simplified inference is also used in the present embodiment in the fuzzy inference for tuning, each of the membership functions is represented as one real number $p_i$, as shown in FIG. 11.

As is apparent from FIG. 11, the label PB corresponds to a real number P7. Therefore, the fuzzy control rule for tuning with respect to the control state of FIG. 8 above is represented as IF $e_j^0$ is NB, and $\Delta e_j^0$ is N, THEN $\Delta h_i$ is p7.

Figure 12A:
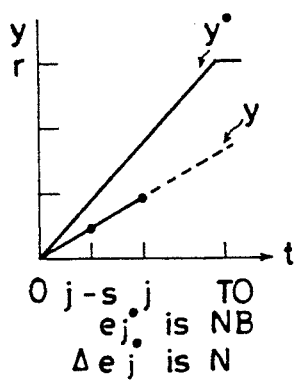
FIGS. 12A to 12O show relations between the ideal response and the control response from the plant under control shown in FIG. 1.

States of generation of the control response $y_j$ with respect to the ideal response $y_j^0$ corresponding to all of the fuzzy divisions shown in FIGS. 9 and 10 are shown in FIGS. 12(A) to 12(O). Fuzzy control rules for tuning corresponding to the states of generation of the control response $Y_j$ shown in FIGS. 12(A) to 12(0) are shown, in a table, in FIG. 13. The fuzzy control rules for tuning shown in FIG. 13 are examples only, and the fuzzy control rules may be described only for representative states of control, as shown in FIG. 14.

The fuzzy knowledge base 10 for tuning stores, as the fuzzy knowledge, the membership functions shown in FIGS. 9 to 11 and the fuzzy control rules for tuning shown in FIG. 13 (or FIG. 14).

The control operation evaluating unit 9 calculates the response deviation $e_j^0$ and the amount of change (a primary difference) $\Delta e_j^0$ of the response deviation, based on the stored contents in the response waveform table 7 and the ideal response waveform storing table 8.

The fuzzy inference unit 11 for tuning receives the response deviation $e_j^0$ and the primary difference $\Delta e_j^0$ thereof as input variables, and calculate the amount of correction $\Delta hi$ with respect to the real number value hi of the consequent portion of the fuzzy control rule stored in the fuzzy control knowledge base 2 as given by the following equation (6), based on the fuzzy knowledge stored in the fuzzy knowledge base 10 for tuning.

$$\Delta h_0 = \sum_{k=1}^{m} \mu_k \cdot p_k / \sum_{k=1}^{m} \mu_k \quad (6)$$

Where m: total number of fuzzy rules for tuning,
$\mu_k$: grade of a k-th fuzzy rule for tuning with respect to the inputs $e_j^0$ and $\Delta e_j^0$.

The fuzzy inference unit 11 for tuning further calculates a new value of the consequent portion in accordance with the following equation (7) based on the calculated amount of correction $\Delta hi$ for the respective rules, and corrects the values of the consequent potions of respective fuzzy control rules in the fuzzy control knowledge base 2 at the present sample time j.

$$h_i^{NEW} = h_i^{OLD} + W_i^{(j-s)} \cdot h_i \quad (7)$$

where $W_i^{(j-s)}$: grade of an i-th fuzzy control rule at a sample time (j−s)
$h_i^{OLD}$: the value of the consequent portion of the fuzzy control rule used at the sample time (j−s)
$h_i^{NEW}$: the value of the consequent portion of the fuzzy control rule corrected at the sample time j.

The grade $W_i^{(j-s)}$ of the fuzzy control rule has been calculated for each of the rules in the fuzzy inference unit 3 when the primary difference $\Delta u_{j-s}$ of the manipulated variable $\Delta u_{j-s}$ is calculated at the sample time (j−s), and it has been written from the fuzzy inference unit 3 to the rule grade storing table 6.

The value $h_i^{NEW}$ of the corrected consequent portion is applied to the fuzzy control knowledge base 2, and rewriting (updating of the value $h_i^{OLD}$ of the consequent portion used at the sample time (j−s)) is carried out. This correcting operation is carried out in real time at each sample time.

The above described tuning of the fuzzy control rule is carried out in real time in parallel with the control operation of the plant 4, until a stop condition as represented by the following equation (8), for example, is satisfied.

$$\sum_{j=1}^{n} (y_j - y_j^0)^2 = \sum_{j=1}^{n} (e_j^0)^2 \leq \delta \quad (8)$$

where $\delta$: a positive small number given in advance, and
n: total number of sample times during the control operation, or the number of samples in the settling time.

When tuning is newly carried out, the fuzzy control rules provided by the last tuning operation are used as the initial rules, and the above described tuning operation is carried out in real time.

As described above, by applying a fuzzy inference to an inference of an amount of correction of the membership function in a consequent portion of a fuzzy control rule, more precise tuning of the fuzzy control rule according to the magnitude of the response deviation $e_j^0$ and the primary difference $\Delta e_j^0$ thereof is realized. Even if the difference between the ideal response and the control response based on the initial control rule (initial response deviation) is fairly large, tuning of the fuzzy control rule is possible, and therefore robustness of tuning and convergence efficiency can be improved.

In the above described tuning operation of the fuzzy control rule, the fuzzy control rule provided by the last tuning operation is used as the initial rule for the present tuning operation. In this method, the fuzzy control rules as starting rules used in the first tuning operation must be set beforehand. In the following, a method of automatically creating an initial fuzzy control rules as the starting rules will be described.

Figure 12B:
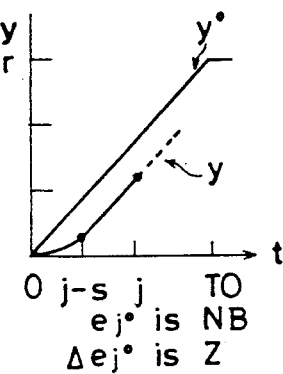
Figure 12C:
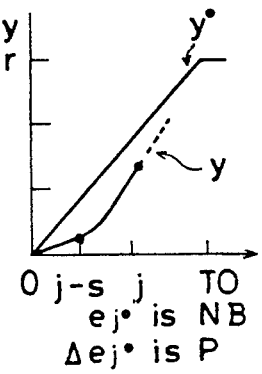

The manner of control in accordance with the fuzzy control rules is similar to that of the PID (Proportional, Integration, Differentiation) control as shown in FIGS. 12(A) to 12(0) Therefore, the initial fuzzy control rule is constructed by utilizing optimized PID control parameters.

The method of constructing the fuzzy knowledge base in the following description is to be applied to a fuzzy control unit having an automatic tuning function such as shown in FIG. 1, for example. However, the method of constructing the fuzzy knowledge base described below is generally applicable to fuzzy control units having function of tuning fuzzy control rules. Therefore, a general method of constructing an initial fuzzy knowledge base will be described.

Figure 15A:
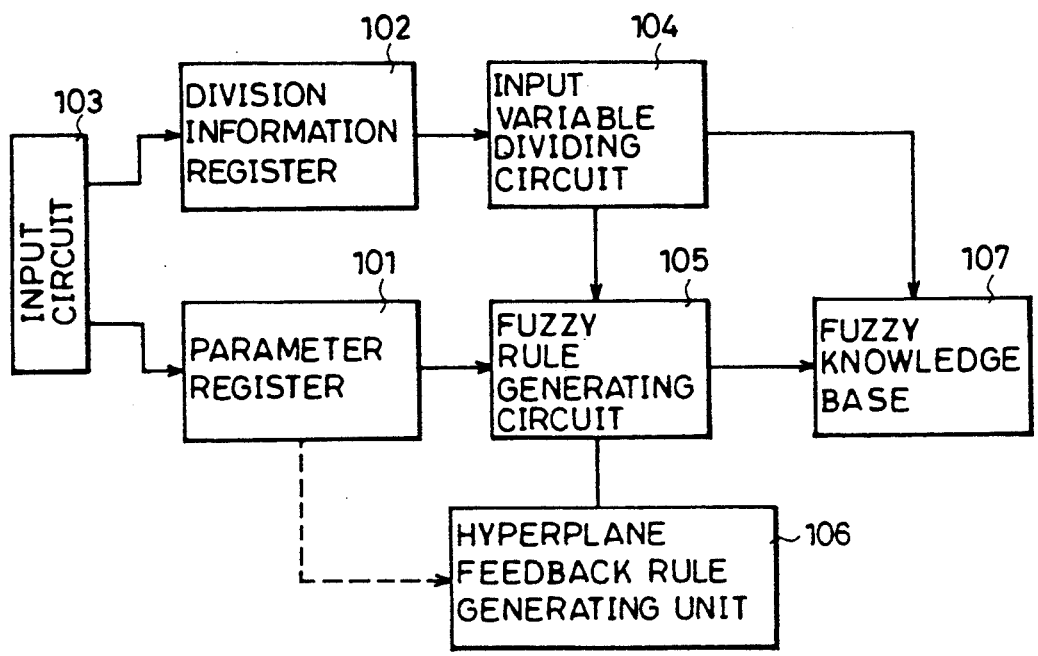
FIG. 15A is a block diagram schematically showing a whole structure of a fuzzy knowledge base constructing unit in accordance with the present invention.

FIG. 15A schematically shows a structure of a fuzzy knowledge base constructing unit in accordance with the present invention. Referring to FIG. 15A, the fuzzy knowledge base constructing unit comprises a parameter register 101 storing optimized PID parameters provided by an automatic tuning PID control unit which will be described later; a division information register 102 storing the number of fuzzy division of input variables which will be the antecedent portion variables of the fuzzy rules and the range thereof (for example, maximum and minimum values of the input variable) with respect to respective input variables; and an input circuit 103 including a keyboard and the like for writing necessary information to the parameter register 101 and to the division information register 102.

The constructing unit further comprises an input variable dividing circuit 104 for fuzzy diving each input variable into portions of a set number of divisions to generate a standard membership functions, based on the division information of the input variables stored in the division information resister 102; and a fuzzy rule generating circuit 105 for determining a consequent portion of the fuzzy rule to generate the fuzzy rule from the PID parameters stored in the parameter register 101 and from the standard membership functions generated by the input variable dividing circuit 104.

The fuzzy rule generating circuit 105 receives a representative value of a label allotted to each division of the input variable formed in the input variable dividing circuit 104 and determines the consequent portion in accordance with a hyperplane feedback rule set based on the PID parameters in a hyperplane feedback rule generating unit 106.

Now, "a representative value of a label" means "a value at which the grade value of the membership function attains to 1".

The fuzzy knowledge base constructing unit further comprises a fuzzy knowledge base 107 storing membership functions of respective input variables (antecedent portion variables) generated in the input variable dividing circuit 104 and the fuzzy rules generated in the fuzzy rule generating circuit 105. The fuzzy knowledge base 107 corresponds to the fuzzy control knowledge base 2 of FIG. 1.

Figure 16:
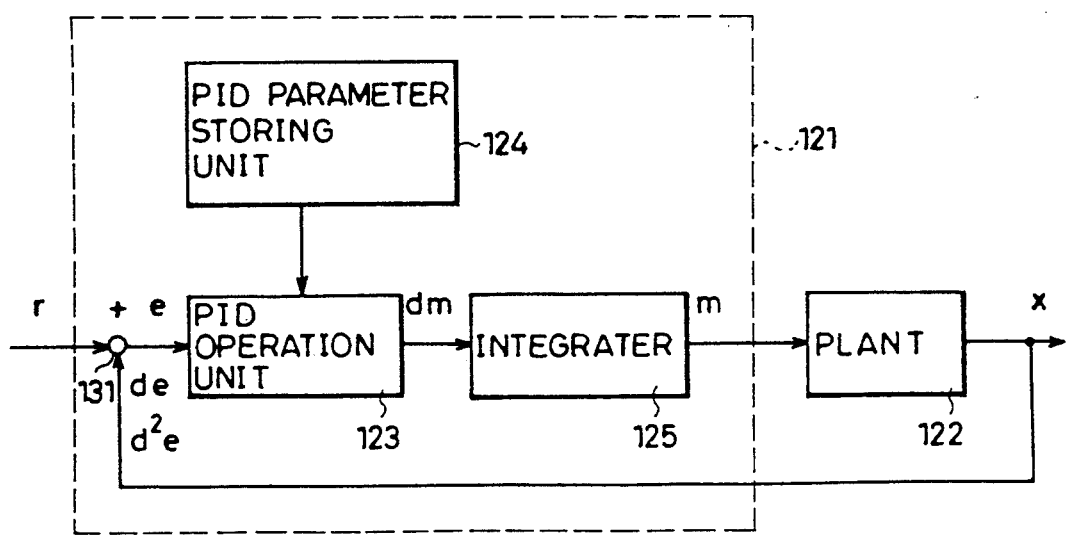
FIG. 16 is a block diagram schematically showing a structure of a PID arithmetic operation unit used for determining optimal PID parameters for a parameter register shown in FIG. 15.

The optimized PID parameters stored in the parameter register 101 are determined by a PID control unit shown in FIG. 16.

Referring to FIG. 16, the PID control unit 121 carries out PID control such that the control response X of the plant 122 under control is made equal to the set value r.

The PID control unit 121 comprises a PID parameter storing unit 124 for storing PID parameters $K_I$, $K_P$ and $K_D$, and a calculator 131 receiving the set value r and the control response x from the plant 122 for calculating the control deviation e, a primary differential de of the control deviation e and a secondary differential $d^2e$ of the control deviation e.

If the PID control unit 121 is formed to carry out digital operation, more specifically, if the control response x is sampled at prescribed sampling intervals and the control deviation e, the primary differential de of the control deviation e and the secondary differential $d^2e$ of the control deviation e are calculated at every sampling time, the primary differential and secondary differential correspond to the primary difference and secondary difference, respectively. The variables e, de, $d^2e$ are obtained by the following equations.

$$\left. \begin{array}{l} e = x(t) - r \\ de = e(t + \Delta t) - e(t) \\ d^2e = de(t + \Delta t) - de(t) \end{array} \right\} \quad (9)$$

or $$\left. \begin{array}{l} e = x_j - r \\ de = \Delta e_j = e_j - e_{j-s} \\ d^2e = \Delta^2 e_j = \Delta e_j - \Delta e_{j-s} \end{array} \right\} \quad (9')$$

where
  t: time,
  $\Delta t$: amount of change of time
  $x_j$: control response at the sample time j,
  $e_j$: control deviation at the sample time j,
  $e_{j-s}$: control deviation at the sample time j−s,
  $\Delta e_j$: primary difference of control deviation at the sample time j,
  $\Delta e_{j-s}$: primary difference of control deviation at the sample time j−s,
  $\Delta^2 e_j$: secondary difference of control deviation at the sample time j, and
  $\Delta^2 e_{j-s}$: secondary difference of control deviation at the sample time j−s.

In general, the time period s is made equal to 1 or s=1. However, a positive number value is used for the period s in order to ensure sufficient dynamic ranges and precision of the variables e, de, $d^2e$, The PID control unit 121 further comprises a PID arithmetic operation unit 123 for calculating the primary differential dm of the manipulated variable m by carrying out PID operation based on the variables e, de and d²e from the calculator 131 and on the PID parameters $K_I$, $K_P$ and $K_D$ stored in the PID parameter storing unit 124; and an integrator 125 for integrating (or summing) the calculated primary differential dm of the manipulated variable m with time to generate the manipulated variable m to apply the same to the plant 122 under control.

In a common PID operation, the manipulated variable m is calculated in accordance with the following equation (10) from the control deviation e, the primary differential (or primary difference) de of the control deviation e and the primary integral (or primary sum) $\int e \cdot dt$ of the control deviation e at the present time (or the sample time) t and from the set value r.

$$m = K_P \cdot e + K_I \int_{t_0}^{t} e \, dt + K_D \cdot de \tag{10}$$

The parameter $K_P$ represents sensitivity, and the parameters $K_I$ and $K_D$ are related with the integral time $T_I$ and differential time $T_D$ in accordance with the following equation (11).

$$\left. \begin{array}{l} K_I = K_P / T_I \\ K_D = K_P \cdot T_D \end{array} \right\} \tag{11}$$

In the PID control unit shown in FIG. 16, it is assumed that the PID operation is carried out based on the following equation (11') which is a differential representation of the above equation (10), taking in consideration that it is applied to a fuzzy control unit based on fuzzy knowledge.

$$dm = (K_I \cdot e + K_P \cdot de + K_D \cdot d^2 e) \cdot dt \tag{11'}$$

where dt is a sampling time interval

Figure 15B:
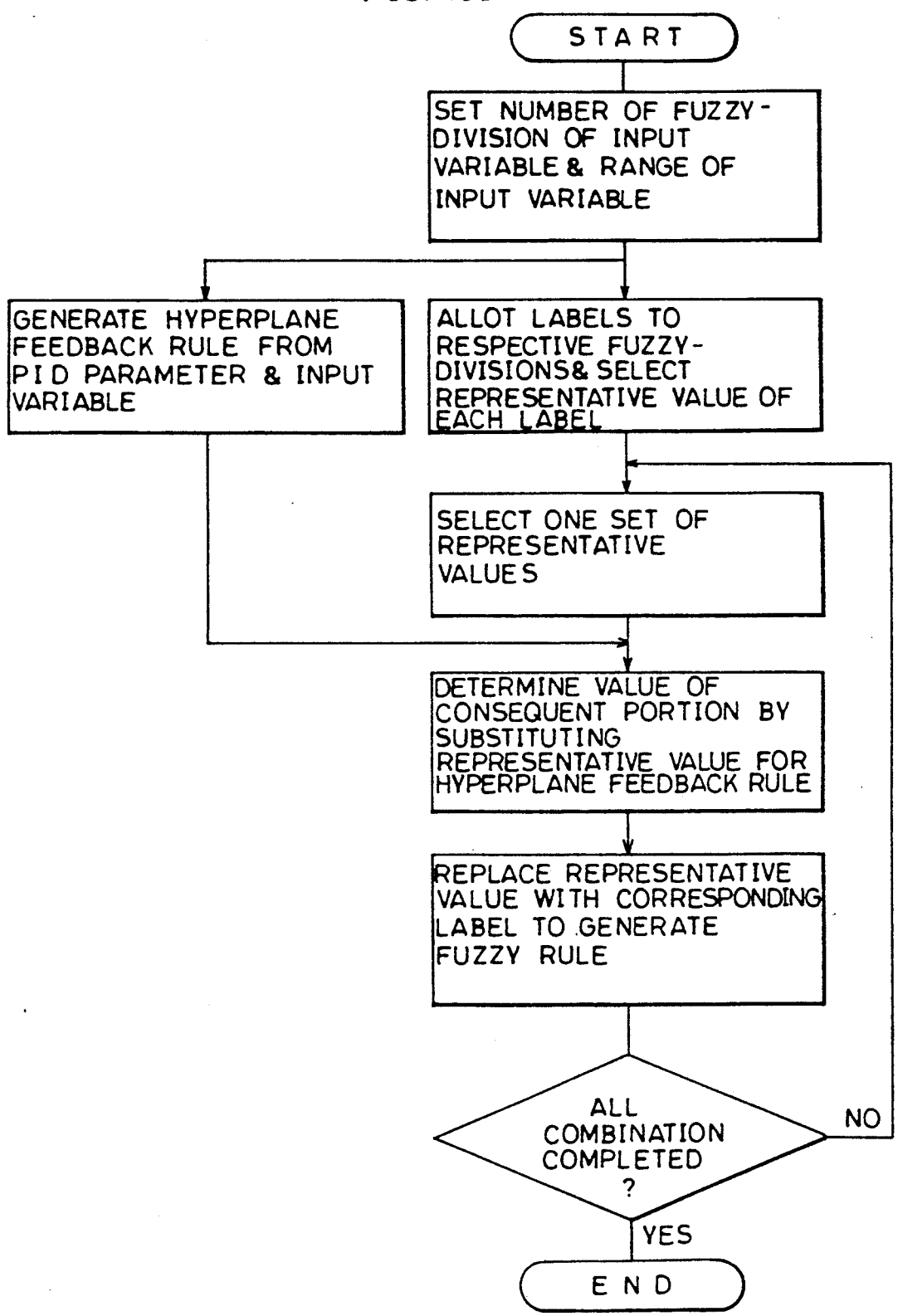
FIG. 15B is a flow chart showing the operation of the unit shown in FIG. 15A.

The PID operation unit 123 carries out the arithmetic operation in accordance with the equation (11') which is a feedback rule, and calculates the primary differential dm of the manipulated variable. The integrator 125 integrates with time an output dm from the PID operation unit 123 and outputs the manipulated variable m. The initial value $m_0$ ($=m(t_0)$) at the start time t0 of integration by the integrator 125 is set to have an appropriate value in advance in the integrator 125. The operation of the fuzzy knowledge base constructing unit shown in FIG. 15A will be described with reference to the operational flow chart of FIG. 15B.

In a PID control unit 121 as shown in FIG. 16, the PID parameters are tuned to realize optimal PID control. The tuning of the PID parameters may be done in accordance with a conventional method, or it may be done in accordance with a method of tuning which will be described in detail later. A primary differential dm of the manipulated variable m is calculated by using the optimal PID parameters $K_P^*$, $K_I^*$ and $K_D^*$ provided by tuning the PID parameters. A feedback rule used for calculating the primary differential dm, that is $$p: (e, de, d^2e) \rightarrow dm$$

is represented by a hyperplane in a four dimensional orthogonal space ($e \times de \times d^2e \times dm$):

$$dm = (K_I^* \cdot e + K_P^* \cdot de + K_D^* \cdot d^2 e) \cdot dt \tag{12}$$

This feedback rule P is called a hyperplane feedback rule P, which is generated in a hyperplane feedback rule generating unit 106.

The optimized PID parameters $K_P^*$, $K_I^*$ and $K_D^*$ are input through a keyboard in the input circuit 103 and stored in the parameter register 101. Alternatively, without using the keyboard, the optimized parameters $K_P^*$, $K_I^*$ and $K_D^*$ stored in the PID parameter storing unit 124 may be transferred to the parameter register 101 through the input circuit 103 on line, by connecting or linking the PID parameter storing unit 124 of the PID control unit 121 with the input circuit 103.

If the fuzzy knowledge is to be otherwisely constructed by utilizing parameters of PI control system or PD control system, the PI parameters or the PD parameters are stored in the parameter register 101 corresponding to the employed control system.

Corresponding to the types of the parameters (PID parameters, PI parameters, PD parameters) stored in the parameter register 101, the range of each of the input variables (all or some of e, de and d²e) which will be the antecedent portion variables of the fuzzy rules and division number of each range are input from the input circuit 103. The range of the input variable is, for example, defined by the maximum value and the minimum value of each variable.

The range (defined range) and the division number of each of the variables input from the input circuit 103 are stored in the division information register 102.

The input variable dividing circuit 104 carries out standard division of each input variable and formation of a membership function corresponding to the division, in accordance with the information stored in the division information register 102. The operation of the input variable dividing circuit 104 will be more specifically described in the following.

Let us assume that as the ranges of the input variables e, de and d²e, ($e_{max}, -e_{max}$), ($de_{max}, -de_{max}$) and ($d^2e_{max}, -d^2e_{max}$) are set as (maximum value, minimum value), and the division numbers of these variables are all set to 7. When such conditions are set in the division information register 102, the input variable dividing circuit 104 carries out the following operation.

Figure 17:
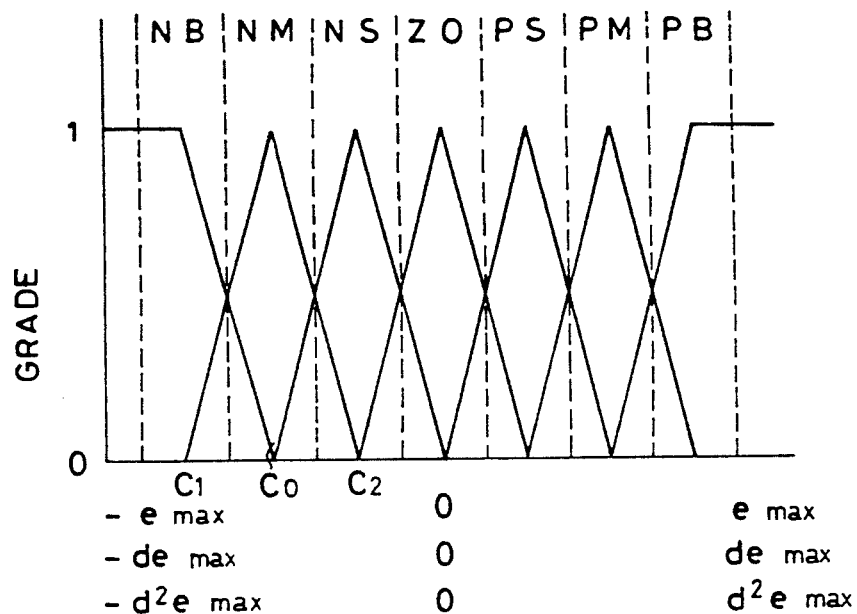
FIG. 17 shows examples of the membership function and the fuzzy division of the fuzzy rule antecedent portion generated by an input variable dividing circuit shown in FIG. 15.

Referring to FIG. 17, it equally divides into 7 portions each range of the input variables e, de and d²e on an input variable axis. As an alternative to the method in which the range of an input variable is divided into N equal portions when N of the division number is supplied, such a method may be employed that a region near 0 of the input variable is finely divided while a region is coarsely divided as the absolute value of the input variable increases, for example, according to a predeterminedly set ratio. Labels NB, . . . , PB corresponding to the set division number 7 are allotted to respective divided input variable regions (sub regions). A standard membership function is generated by each input variable axis. Now, in FIG. 17, the input variables e, de and d²e are all shown on the same axis. Actually, division of the range and labeling to each of the input variables e, de and d²e are carried out independently.

Membership functions of various types may be used as the standard membership functions. FIG. 17 shows a case in which a membership function of an isosceles triangle is used as the standard membership function.

The isosceles triangle membership function is formed in accordance with the following steps:

(a) the middle point (for example, C0) on the input variable axis of a sub range (NM) is regarded as a vertex of the isosceles triangle. This vertex provides the grade of 1; (b) middle points (C1, C2) on the input variable axis of adjacent two sub regions (NB, NS) are connected to the vertex. These middle points of the adjacent sub regions provide the grade of 0.

However, the membership function of the minimum and maximum sub regions (NB, PB) on the input variable axis is a trapezoidal function not an isosceles triangle function.

A bell shaped function in which the middle point on the input variable axis of a sub region provides the grade of 1 may be employed as the standard membership function.

In the foregoing, generation of an isosceles triangle type and a trapezoid type standard membership functions is described when the input variable range is divided into equal portions. In unequal division method, the standard membership functions are generated by replacing the said middle point by an interior division point of the ratio of l1 to l2 which interiorly divides a sub region input axis into portions of the ratio of l1 to l2, where $0<l1$, $0<l2$, and $l1 \neq l2$.

The input variable dividing circuit 4 outputs the representative value of each label of the generated membership functions, together with standard fuzzy rule in accordance with the number of division of the input variable (antecedent portion variable), to the fuzzy generating circuit 105. A value of the input variable when the membership value is 1, for example, which is a value at the middle point on the input variable axis in the sub region in the example of FIG. 17, is used as the representative value of the label.

In a PID control system, when a first antecedent portion variable (control deviation) e is divided into L portions, a second antecedent portion variable (primary differential of the control deviation) de is divided into M portions, and a third antecedent portion variable (secondary differential of the control deviation) $d^2e$ is divided into N portions, a standard fuzzy rule $R_{ijk}$ is provided by $R_{ijk}$: IF $e=e_i$, and $de=de_j$, and $d^2e=d^2e_k$, THEN, $dm=dm_{ijk}$ where $i=1$ to L; $j=1$ to M; $k=1$ to N, $e_i$, $de_j$, $d^2e_k$ and $dm_{ijk}$ correspond to labels.

When a PI control system or a PD control system is applied, the antecedent portion variables are e and de or de and $d^2e$. The standard fuzzy rule $R_{ij}$ and $R_{jk}$ for respective systems are provided by $R_{ij}$: IF $e=e_i$, and $de=de_j$, THEN $dm=dm_{ij}$,
where $i=1$ to L, $j=1$ to M, $R_{jk}$: IF $de=de_j$, and $d^2e=d^2e_k$, THEN $dm=dm_{jk}$,
where $j=1$ to M, $k=1$ to N The hyperplane feedback generating unit 106 generates and holds a feedback rule for the PID control system represented as $$dm=(K_I^* \cdot e + K_P^* \cdot de + K_D^* \cdot d^2 e) \cdot dt \qquad (12)$$

from the PID parameters $K_P^*$, $K_I^*$ and $K_D^*$ stored in the parameter register 101, as previously mentioned.

The fuzzy rule generating circuit 105 substitutes the representative value of the corresponding antecedent portion variable into the feedback rule represented by the equation (12) to calculate the amount dm, for each of the applied standard fuzzy rules $R_{ijk}$, and the value of the calculated amount $dm_{ijk}$ is used as the real number of the consequent portion of the fuzzy rule $R_{ijk}$. The fuzzy rule is acquired on the premise of a simplified inference.

More specifically, the real number dm of the consequent portion in each fuzzy rule is provided by $$dm_{ijk}=(K_I^* \cdot e_i + K_P^* \cdot de_j + K_D^* \cdot d^2 e_k) \cdot dt \qquad (12')$$

where $i=1$ to L; $j=1$ to M; $k=1$ to N,
$e_i$, $de_j$ and $d^2e_k$ are representative values at each label included in the rule $R_{ijk}$,
in accordance with the feedback rule of the equation (12) or (12').

Further, the fuzzy rule generating circuit 105 generates the fuzzy rule by the following steps, when the real number value dm of the consequent portion is calculated.

(a) Respective states ($e_i$, $de_j$ and $d^2e_k$ in the rule $R_{ijk}$) of the antecedent portion of the standard fuzzy rule are replaced with the labels (PS, PB and the such) of the representative values substituted as the antecedent portion variables when the consequent portion is determined.

(b) The label (output state) of the consequent portion is replaced with the calculated real number value $dm_{ijk}$. Then, each of the membership functions of the consequent portion is represented by one real number value.

The fuzzy rules generated in the fuzzy rule generating circuit 105 are stored together with the membership functions generated in the input variable dividing circuit 104 in the fuzzy knowledge base 107.

In accordance with such a method of constructing the fuzzy knowledge base, a fuzzy knowledge base which satisfactory approximates a hyperplane feedback rule based on optimized PID parameters can be automatically constructed.

Particularly, where algebraic-multiplication-summation-gravity method is used, the hyperplane feedback rule based on PID parameters coincides with the feedback rule based on fuzzy knowledge.

If not the PID control system but the PI control system or the PD control system is applied, the real number value dm of the consequent portion is calculated from the representative values of the respective related antecedent portion variables (input variables).

For example, for the PI control system, the real number value of the consequent portion is calculated in accordance with $$dm_{ij} = (K_I^* \cdot e_i + K_P^* \cdot de_j) \cdot dt$$
$$i = 1 \text{ to } L; j = 1 \text{ to } M,$$

and for the PD control system, the real number value of the consequent portion is calculated in accordance with $$dm_{jk} = (K_P^* \cdot de_j + K_D^* \cdot d^2 e_k) \cdot dt$$
$$j = 1 \text{ to } M; k = 1 \text{ to } N,$$

The fuzzy knowledge stored in the fuzzy knowledge base 107 is subjected to tuning for optimization by a tuning unit such as shown in FIG. 1, if necessary.

In a practical use, fuzzy control is effected by using the fuzzy knowledge in the fuzzy knowledge base 107. A schematic structure of such a fuzzy control unit is shown in FIG. 18.

Figure 18:
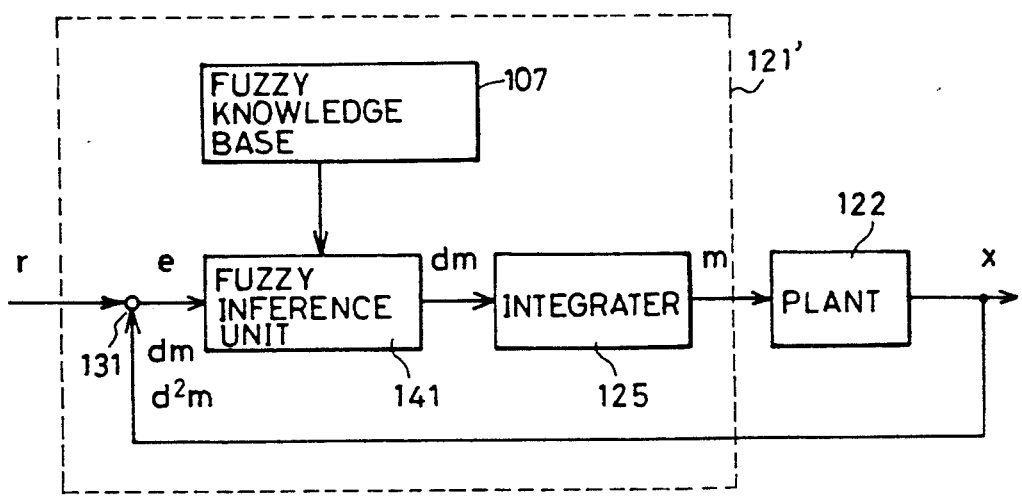
FIG. 18 is a block diagram schematically showing a structure of a fuzzy control unit performing a controlling operation in accordance with fuzzy knowledge of a fuzzy knowledge base shown in FIG. 15.

Referring to FIG. 18, the fuzzy control unit 121 comprises a fuzzy inference unit 141 in place of the PID calculating unit 123 of FIG. 16, and a fuzzy knowledge base 107 in place of the PID parameter storing unit 124 of FIG. 16. The fuzzy inference unit 141 and an integrator 125 shown in FIG. 18 correspond to the fuzzy inference unit 3 and the calculator 32 shown in FIG. 1, respectively. The plant under control shown in FIG. 16 and the plant under control shown in FIG. 18 execute the same control action.

In accordance with the above described method of constructing fuzzy knowledge, fuzzy rules can be constructed without manual operation. Fuzzy rules effecting control which is a close approximation of the feedback rule based on the PID parameters, PD parameters or the PI parameters can be provided, and therefore control similar to at least the PID (PD or PI) control can be realized.

In the above described automatic acquisition of the fuzzy knowledge base, optimal PID parameters are calculated for utilization through PID control action. The PID parameters are stored in the PID parameter storing unit 124 shown in FIG. 16. The method for optimizing the PID parameters will be described in detail below. The method of optimization of the PID parameters can be applied not only to the construction of the fuzzy knowledge base but also to general PID control units. In the following, optimization of PID parameters in a general PID control unit will be described.

Figure 19:
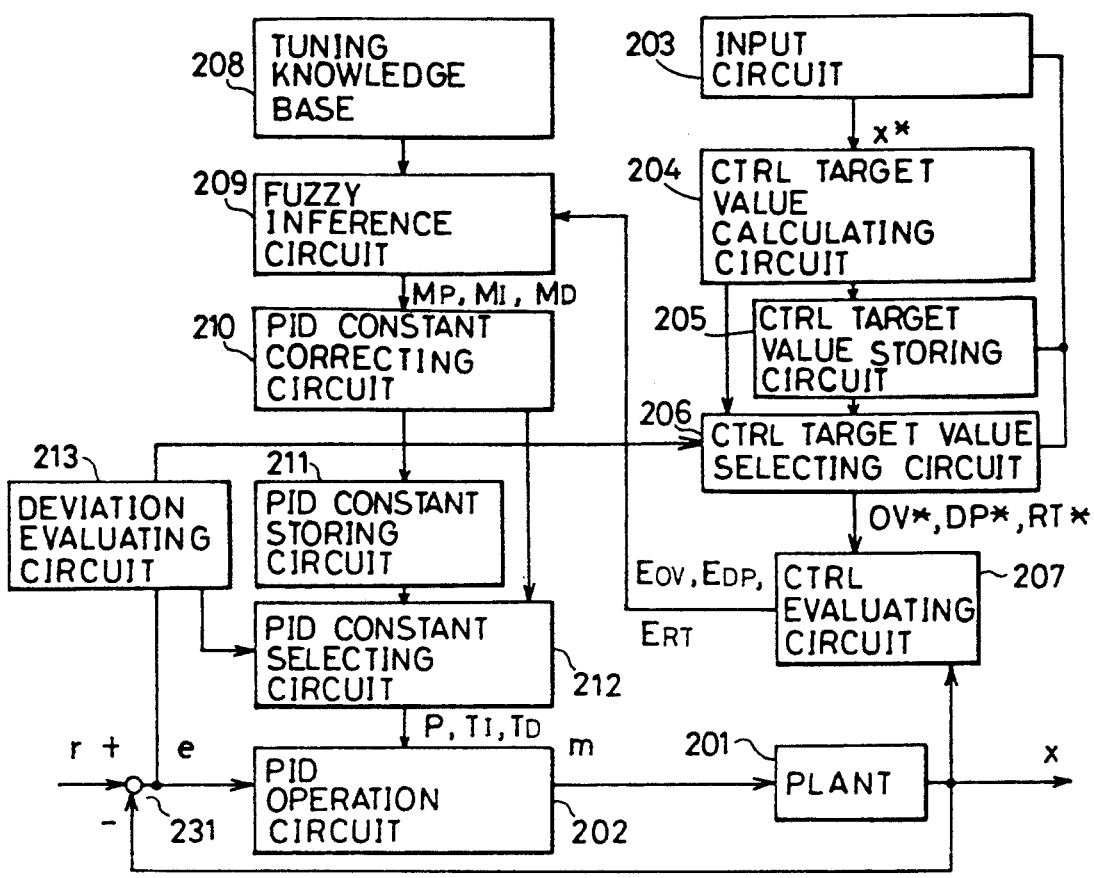
FIG. 19 is a block diagram schematically showing a whole structure of an automatic tuning PID unit using PID parameters as control parameters, which is another embodiment of the present invention.

FIG. 19 schematically shows a whole structure of a PID control unit having the function of automatically tuning the PID parameters, in accordance with the present invention.

Referring to FIG. 19, the PID control unit comprises a PID operation circuit 202 controlling the plant 201 such that control response from the plant 201 is made equal to the set value r; a PID constant storing circuit 211 for storing PID parameters P (Proportional Band), $T_I$(Integral Time) and $T_D$(Differential Time) necessary for the PID arithmetic operation of the PID operation circuit 202; a calculator 231 for calculating control deviation e from the set value r and a control response x; a deviation evaluating circuit 213 for evaluating range of existence of the control deviation e; and a PID constant selecting circuit 212 for selecting a set of PID parameters stored in the PID constant storing circuit 211 to apply the same to the PID operation circuit 202, in accordance with the determination of the deviation determining circuit 213.

The PID operation circuit 202 receives the control deviation e from the calculator 231, calculates the manipulated variable m based on the PID parameters P, $T_I$ and $T_D$ selected by the PID constant selecting circuit 212, and applies thus calculated manipulated variable m to the plant 201 under control. The parameter P is provided as a reciprocal of the sensitivity $K_P$. The parameter $T_I$ is provided by $T_I = K_P/K_I$, and the parameter $T_D$ is provided by $T_D = K_D/K_P$.

The PID constant storing circuit 211 is capable of storing plural sets of PID parameters corresponding to plural target values of control. The PID selecting circuit 212 selects, when the PID constant storing circuit 211 stores only a set of PID parameters, that set of PID parameters, and selects, when the storing circuit 211 stores plural sets of PID parameters, one set of PID parameters in accordance with the determination by the deviation determining circuit 213.

The PID control unit further comprises an input circuit 203 for inputting an ideal response waveform or a control target value; a control target value calculating circuit 204 for calculating a characteristic variable values such as an amount of overshoot, amplitude attenuation ratio (dumping ratio), and reaching time, from the ideal control response waveform provided from the input circuit 203; a control target value storing circuit 205 capable of storing plural sets of the control target values applied from the input circuit 203 or the control target values calculated in the control target value calculating circuit 204; and a control target value selecting circuit 206 for selecting and outputting one set of control target values from the control target value storing circuit, in accordance with the determination by the deviation evaluation circuit 213.

The control target value selecting circuit 206 reads, when only a set of control target values are stored in the control target value storing circuit 205, this set of control target values, and when plural sets of control target values are stored, it selects and outputs a set of control target values which accords to the determination by the deviation evaluation circuit 213.

The PID control unit further comprises a control evaluating circuit 207 receiving the control target value selected by the target value selecting circuit 206 and the control response from the plant 201 for evaluating control operation or performance of the control unit. The control evaluating circuit 207 calculates an amount of overshoot, amplitude attenuation ratio (dumping ratio) and the reaching time, which are characteristic variables, from the control response x(t) from the plant 201, calculates difference between the calculated characteristic variables and the characteristic variables from the selecting circuit 206 to output a target deviation of control. These characteristic variables and the target deviation of control will be described later.

The PID control unit further comprises a tuning knowledge base 208 for storing fuzzy knowledge for correcting the PID parameters; a fuzzy inference circuit 209 receiving an output from the control evaluating circuit 207 as an input variable, effects fuzzy inference based on the fuzzy knowledge stored in the knowledge base 208 for outputting correction coefficients for correcting the PID parameters; and a PID constant correcting circuit 210 for correcting the PID parameters in accordance with the correction coefficients from the fuzzy inference circuit 209.

The knowledge base 208 for tuning stores, as fuzzy knowledge, the membership functions for each target deviation of control, and fuzzy rules for correcting the PID parameters such that the target deviation of control is eliminated (to be zero) according to the target deviation of control. The operation will be described. The PID operation circuit 202 calculates and outputs a manipulated variable m(t) from the control deviation e(t) in accordance with the following equation (13), when the proportional band P, integral time $T_I$ and differential time $T_D$ as PID parameters are applied.

$$m(t) = \frac{100}{P} \cdot \left( e(t) + \frac{1}{T_I} \int_{t_0}^{t} e(t)\, dt + T_D \frac{de(t)}{dt} \right) \quad (13)$$

where,
$e(t) = r(t) - x(t)$ t: time.

The plant 201 carries out control action in accordance with the manipulated variable m(t) from the PID operation circuit 202 to output a control response x(t).

A set of an amount of overshoot OV*, a dumping ratio DP* and a reaching time RT* as the target values of control are input from the input circuit 203. When there is only one set of these control desired values, these input control target values are applied to the control evaluating circuit 207 through the control target value selecting circuit 206. The selecting operation of the selecting circuit 206 is done in response to control signals from the input circuit 203.

The control evaluating circuit 207 calculates, from the control response x(t), the characteristic variables, that is, the amount of overshoot OV, the dumping ratio DP and the reaching time RT of the control response.

The amount of overshoot OV represents the ratio of excess from the set value r. The dumping ratio DP represents ratio of attenuation of the control response with respect to the set value r. The reaching time RT represents the time from the start of control until the control response reaches the set value.

Figure 20:
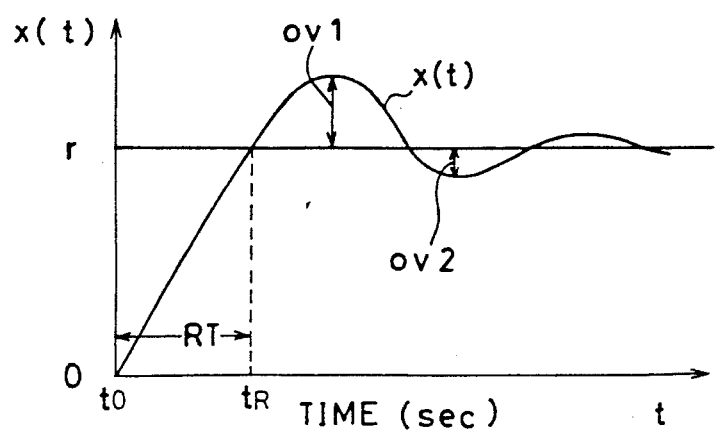
FIG. 20 shows control characteristic variable evaluated by a control evaluating circuit shown in FIG. 19.

The respective characteristics variables are defined as follows when the control response x(t) shown in FIG. 20 is taken as a specific example.

$$OV = 100 \times |ov1/r| \; (\%)$$

$$DP = 100 \times |ov2/ov1| \; (\%) \quad (14)$$

$$RT = t_R - t_O \; (sec)$$

The control evaluating circuit 207 further calculates the target deviations of control of the amount of overshoot, the dumping ratio and the reaching time, respectively, from the input control target values and the characteristic variables calculated in accordance with the equation (14), by the following equations (15).

$$\left. \begin{array}{l} E_{OV} = OV - OV^* \\ E_{DP} = DP - DP^* \\ E_{RT} = (RT - RT^*)/RT^* \end{array} \right\} \quad (15)$$

where $E_{OV}$: target deviation of control of the overshoot amount $E_{DP}$: target deviation of control of the dumping ratio $E_{DP}$: target deviation of control of the reaching time. Various sets of control target values as shown in FIG. 21 are applied to the control evaluating circuit 207, taking in consideration the stability near the control target values (with characteristics against external disturbance predominant), rapid response at activation of a plant, and transient characteristics. All sets of the control target values shown in FIG. 21 may be stored in the control target value storing circuit 205, or only a set of control target may be stored in the storing circuit 205.

FIG. 21 shows sets of the control target values when (i) stability near the control target values is of much interest or a main factor, (ii) convergence to the control target values is of much importance or a predominant factor, and (iii) rapid response and transient characteristics are of much importance.

The control target values OV*, DP* and RT* are, when specific values can be calculated, input through a keyboard in the input circuit 203. However, it is sometimes difficult to directly supply specific values of the control target values. Even in such cases, it is relatively easy to supply ideal control response waveform with respect to the set value r. Therefore, in such cases, the ideal control response waveform is input from the input circuit 203, instead of the control target values.

Input of the ideal response waveform from the input circuit 203 is done by, for example, drawing coordinate axes and the set value r on a display (not shown) and inputting representative coordinate values of the ideal response waveform through a keyboard. In this case, the ideal response waveform x*(t) is calculated by effecting an interpolation such as spline interpolation, of the input representative coordinate values, by the input circuit 203. Alternatively, the ideal control response waveform may be directly drawn on a display screen by using an image information input device such as a mouse or a light pen. Further, PID tuning unit may generate an ideal response waveform based on an appropriate reference model. As a specific example of a transfer function G(s), for a reference model is the following function:

$$G(s) = 1/(1 + Ts)^n,$$

which function is obtained by cascade connection of n first order delay elements. The step response of this function is generally S-shaped so as to gradually and smoothly approach a set value.

The ideal control response waveform x*(t) given by a designer is supplied from the input circuit 203 to the control target value calculating circuit 204. The calculating circuit 204 calculates the control target values (that is, characteristic values of the ideal control response waveform) OV*, DP* and RT* from the supplied ideal control response waveform x*(t) in accordance with the equation (14) used to extract the characteristic variables in the control evaluating circuit 207. The calculated control target values are supplied to the control target value storing circuit 205 or to the control target value selecting circuit 206.

If plural sets of control target values as shown in FIG. 21 are input and stored in the control target value storing circuit 205, one set of control target values is selected by the selecting circuit 206 in accordance with the determination by the deviation evaluating circuit 213.

The control deviation evaluating circuit 213 compares previously set threshold values $\delta_1$ and $\delta_2$ ($0 < \delta_1 < \delta_2$) with the control deviation e from the calculator 231. The selecting circuit 206 selects, in accordance with the determination (result of the comparison) by the evaluation circuit 213, a corresponding set of control target values out of plural control target values in the storing circuit 205 and supplies the same to the control evaluating circuit 207. The state of selection of the selecting circuit 206 is determined in the following manner, as shown in FIG. 21.

(i) When $|e| \leq \delta_1$, control target values OV*$_1$, DP*$_1$ and RT*$_1$ with stability near the target values predominately considered are selected.

(ii) When $\delta_1 < |e| \leq \delta_2$, control target values OV*$_2$, DP*$_2$ and RT*$_2$ with convergence to the target values predominately considered are selected.

(iii) When $\delta_2 < |e|$, control target values OV*$_3$, DP*$_3$ and RT*$_3$ with rapid response and transient characteristics predominately considered are selected.

When a control target value for a certain plant is of control target values are continuously supplied to the control evaluating circuit 207 from the selecting circuit 206, until the tuning of the PID parameters in accordance with the selected set of control target values is completed.

During tuning, a set value r(t) corresponding to the selected control target is applied. A step input is supplied as a set value r(t) to satisfy the value of control deviation e with respect to the selected target of control, as shown in FIG. 21, for example. Tuning is repeated until optimal PID parameters are provided. The optimal PID parameters are determined by determining conditions which will be described later.

The control target deviations $E_{OV}$, $E_{DP}$ and $E_{RT}$ output from the control evaluating circuit 207 are applied as input variables to the fuzzy inference circuit 209.

The fuzzy inference circuit 209 carries out fuzzy inference such that the antecedent portion variables (control target deviations) are made zero, based on the fuzzy knowledge stored in the fuzzy knowledge base 208 for tuning, using the input variables $E_{OV}$, $E_{DP}$ and $E_{RT}$ as antecedent portion variables, to output PID parameter correcting coefficients $M_P$, $M_I$ and $M_D$.

Figure 24:
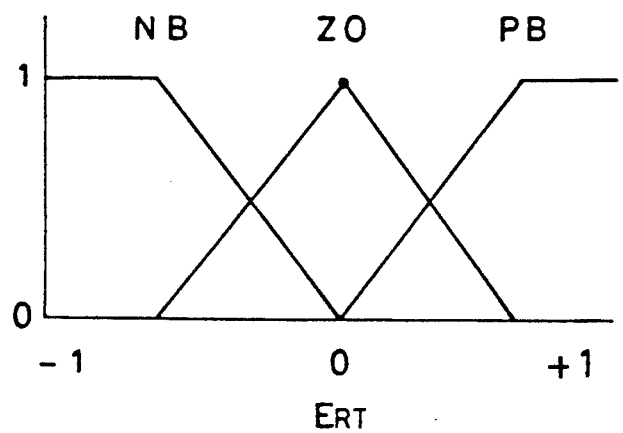
FIG. 24 shows, as an example, the membership function and the fuzzy division for an input variable $E_{RT}$ in the fuzzy knowledge stored in the fuzzy knowledge base shown in FIG. 19.

FIGS. 22 to 24 show the membership functions for the antecedent portion variables $E_{OV}$, $E_{DP}$ and $E_{RT}$ of the fuzzy rules for tuning respectively.

The input variable $E_{OV}$ includes three fuzzy divisions (labels NB, ZO and PB). The input variable $E_{DP}$ includes five fuzzy divisions (labels NB, NM, ZO, PM and PB). The input variable $E_{RT}$ includes three fuzzy division (labels NB, ZO and PB).

Figure 25:
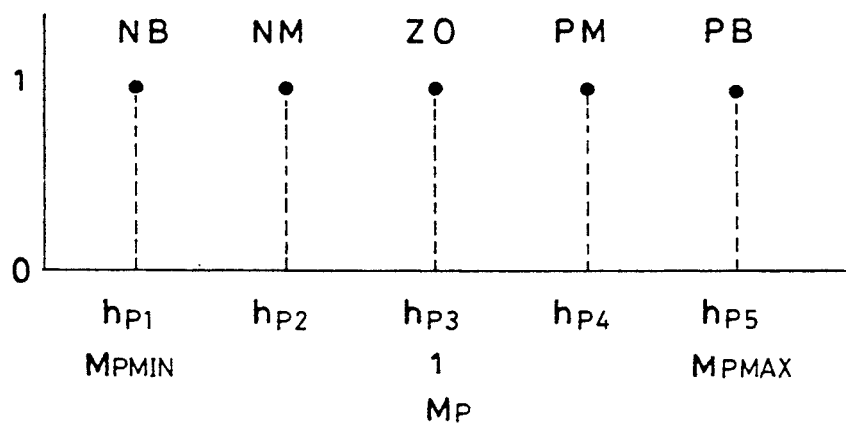
FIG. 25 shows examples of the membership function and the fuzzy division with respect to a proportional parameter correcting coefficient $M_P$ of the fuzzy knowledge stored in the fuzzy knowledge base shown in FIG. 19.
Figure 26:
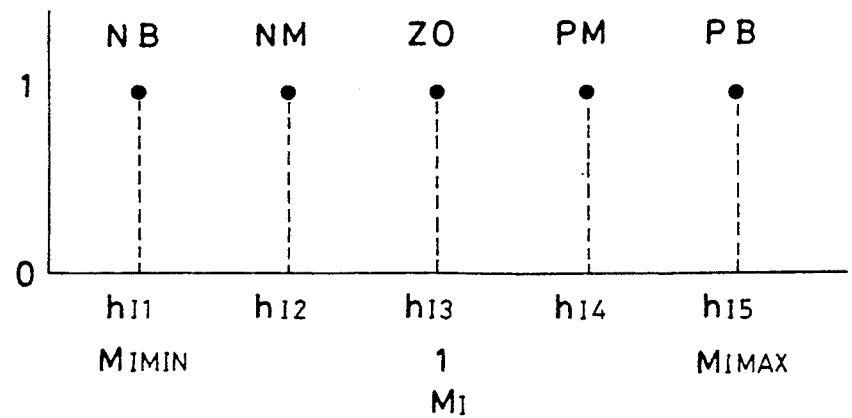
FIG. 26 shows examples of the membership function and the fuzzy division with respect to an integral parameter correcting coefficient $M_I$ of the fuzzy knowledge stored in the fuzzy knowledge base shown in FIG. 19.

FIGS. 25 to 27 show examples of membership functions of the consequent potion variables (output variables; correcting coefficients) $M_P$, $M_I$ and $M_D$. The output variables $M_P$, $M_I$ and $M_D$ all include five fuzzy divisions (labels PB, PM, ZO, NM and NB). Each membership function is represented by one real number value. The membership functions of the consequent portion may be those in the same fuzzy divisions as for the membership functions in the antecedent portion variable.

FIG. 28 shows, in a table, examples of fuzzy rules stored in the knowledge base 208 for tuning.

Referring to FIG. 28, the rule 1 shows

IF $E_{OV}$ is PB, and $E_{DP}$ is PB,

THEN $M_P$ is PB, $M_I$ is PB and $M_D$ is NB.

The fuzzy inference circuit 209 calculates correction coefficients $M_P$, $M_I$ and $M_D$ in accordance with the following equation (16), when the control target deviations $E_{OV}$, $E_{DP}$ and $E_{RT}$ are applied from the control evaluating circuit 207, in accordance with the fuzzy knowledge stored in the knowledge base 208 for tuning.

$$M_P = \sum_{i=1}^{m} W_i \cdot h_{Pi} / \sum_{i=1}^{m} W_i \qquad (16)$$

$$M_I = \sum_{i=1}^{m} W_i \cdot h_{Ii} / \sum_{i=1}^{m} W_i$$

$$M_D = \sum_{i=1}^{m} W_i \cdot h_{Di} / \sum_{i=1}^{m} W_i$$

where m; total number of fuzzy rules $w_i$; grade of an i-th rule with respect to the input variables $E_{OV}$, $E_{DP}$ and $E_{RT}$, and $h_{Pi}$, $h_{Ii}$, $h_{Di}$; labels of respective correcting coefficients $M_P$, $M_I$ and $M_D$ of the i-th fuzzy rule.

If each label of the consequent portion is not represented by one real number but by a trapezoidal-shaped or triangle-shaped membership function, the correcting coefficients $M_P$, $M_I$ and $M_D$ are calculated in accordance with an inference algorithm such as MIN/MAX—center of gravity method, or algebraic—multiplication—summation—gravity method.

The PID constant correcting circuit 210 generates new PID parameters by correcting the PID parameters P, $T_I$ and $T_D$ in accordance with the correcting coefficients from the fuzzy inference circuit 209.

Now, PID parameters in N-th control cycle are represented as $P^N$, $T_I^N$ and $T_D^N$, and the correcting coefficients are represented as $M_P^N$, $M_I^N$ and $M_D^N$. The PID parameters $P^{N+1}$, $T_I^{N+1}$ and $T_D^{N+1}$ in the (N+1)th control cycle are calculated in accordance with the following equation (17).

$$\left. \begin{array}{l} P^{N+1} = M_P^N \cdot P^N \\ T_I^{N+1} = M_I^N \cdot T_I^N \\ T_D^{N+1} = M_D^N \cdot T_D^N \end{array} \right\} \qquad (17)$$

The PID parameters $P^{N+1}$, $T_I^{N+1}$ and $T_D^{N+1}$ corrected by the PID constant correcting circuit 210 are applied to the PID selecting circuit 212. When tuning of the PID parameters is not completed, the PID selecting circuit 212 applies the PID parameters $P^{N+1}$, $T_I^{N+1}$ and $T_D^{N+1}$ to the PID calculating circuit 202.

The PID calculating circuit 202 uses the applied PID parameters $P^{N+1}$, $T_I^{N+1}$ and $T_D^{N+1}$ to execute the (N+1)th PID control.

The control response x(t) provided as a result of the (N+1)th PID control are applied to the control evaluating circuit 207 as described above. In accordance with the control response x(t), the deviation of control target is calculated, the correcting coefficients for the PID parameters in accordance with fuzzy inference are calculated, and PID parameters are updated, so as to proceed with the tuning process of the PID parameters.

The tuning of PID parameters are continued until the following equation (18) is satisfied:

$$\text{MAX}\{|E_{OV}^N|, |E_{DP}^N|, 100 \cdot |E_{RT}^N|\} < \epsilon \qquad (18)$$

where MAX {,} is a function which takes the maximum value of the values in {}. $\epsilon$ is a constant small positive number given in advance for determining completion of tuning. Determination of the completion of tuning may be done in the control evaluating circuit 207. Alternatively, it may be done by a determining circuit (not shown) receiving an output from the control evaluating circuit 207.

When the above equation (18) is satisfied, tuning of the PID parameters is completed. At this time, a set of optimized PID parameters ($P^*$, $T_I^*$, $T_D^*$) corresponding to the values (OV*, DP*, RT*) of the control target values set at the beginning is determined. The set of the optimal PID parameters ($P^*$, $T_I^*$, $T_D^*$) are written or transferred from the PID constant correcting circuit 210 to the PID constant storing circuit 211 to be stored therein.

FIG. 29 shows an example of storage of the PID parameters P*, $T_I^*$ and $T_D^*$ after the completion of tuning, of the PID constant storing circuit 211. As shown in FIG. 29, the PID constant storing circuit 211 stores the PID parameters P*, $T_I^*$ and $T_D^*$ together with the ranges of the corresponding control deviations e, for every target of control.

The selecting circuit 212 selects the corresponding set of PID parameters from the PID constant storing circuit 211 in accordance with the determination by the control deviation evaluating circuit 213 to apply the same to the PID calculating circuit 202. The PID control corresponding to various states of control is executed in the following manner.

The PID constant storing circuit 211 stores the already tuned, optimized sets of PID parameters for every state of control, that is, in accordance with the relation between magnitudes of the control deviation e and of the threshold values $\delta 1$ and $\delta 2$.

The deviation evaluating circuit 213 calculates the difference between the set value r(t) and the control response x(t) to provide the control deviation e(t). The evaluating circuit 213 further determines the magnitude relation between the absolute value of the calculated control deviation e(t) and the previously set threshold values $\delta 1$ and $\delta 2$, and applies the result of determination to the PID constant selecting circuit 212. The PID constant selecting circuit 212 selects (reads) the corresponding set of PID parameters $P_i$, $T_{Ii}$ and $T_{Di}$ ((i=1 to 3) from the PID constant storing circuit 211 in accordance with the applied result of determination, and applies the same to the PID calculating circuit 202. The PID calculating circuit 202 receives the control deviation e from the calculator 231 and executes the PID calculation in accordance with the applied PID parameters to calculate a manipulated variable m, and applies the same to the plant 201 under control.

As described above, since the optimal PID parameters are selected dependent on the state of control, more precise PID control can be done, compared with the case where single PID parameter set is used. If the calculating circuit 202 executes not the PID calculation but the PD calculation or PI calculation, tuning with respect to the corresponding parameters only, and storing of the corresponding optimized parameters in the storing circuit 211 are carried out.

The above described method of tuning PID parameters provides the following advantages.

(a) By using only one type of knowledge base for tuning PID parameter, PID parameters can be tuned to attain a desired control target suitable for the plant or for the characteristic of process thereon. Accordingly, an automatic tuning PID control unit of low cost can be realized relatively easily.

(b) Even if control target values can not be directly applied, the control target values can be calculated from an input ideal control response waveform, and therefore tuning of the PID parameters to realize desired control can be done easily.

(c) Since the control target values are selected according to the magnitude of the control deviation, optimal PID parameters can be tuned appropriately dependent on the state of control.

(d) Since tuned and optimized PID parameters are stored and PID parameters matching the characteristic which should be considered much are selected dependent on the magnitude of control deviation in a normal operation, the plant can be controlled more precisely.

The automatic fuzzy control rule tuning unit shown in FIG. 1 corrects fuzzy control rules in a fuzzy control unit to optimal rules. The fuzzy knowledge base constructing unit shown in FIG. 15 automatically generates the fuzzy control rules based on PID parameters. The PID control unit shown in FIG. 19 optimizes the PID parameters in accordance with the target of control. A superior fuzzy control unit having a function of learning fuzzy control rules can be realized by combining these three units.

Figure 30:
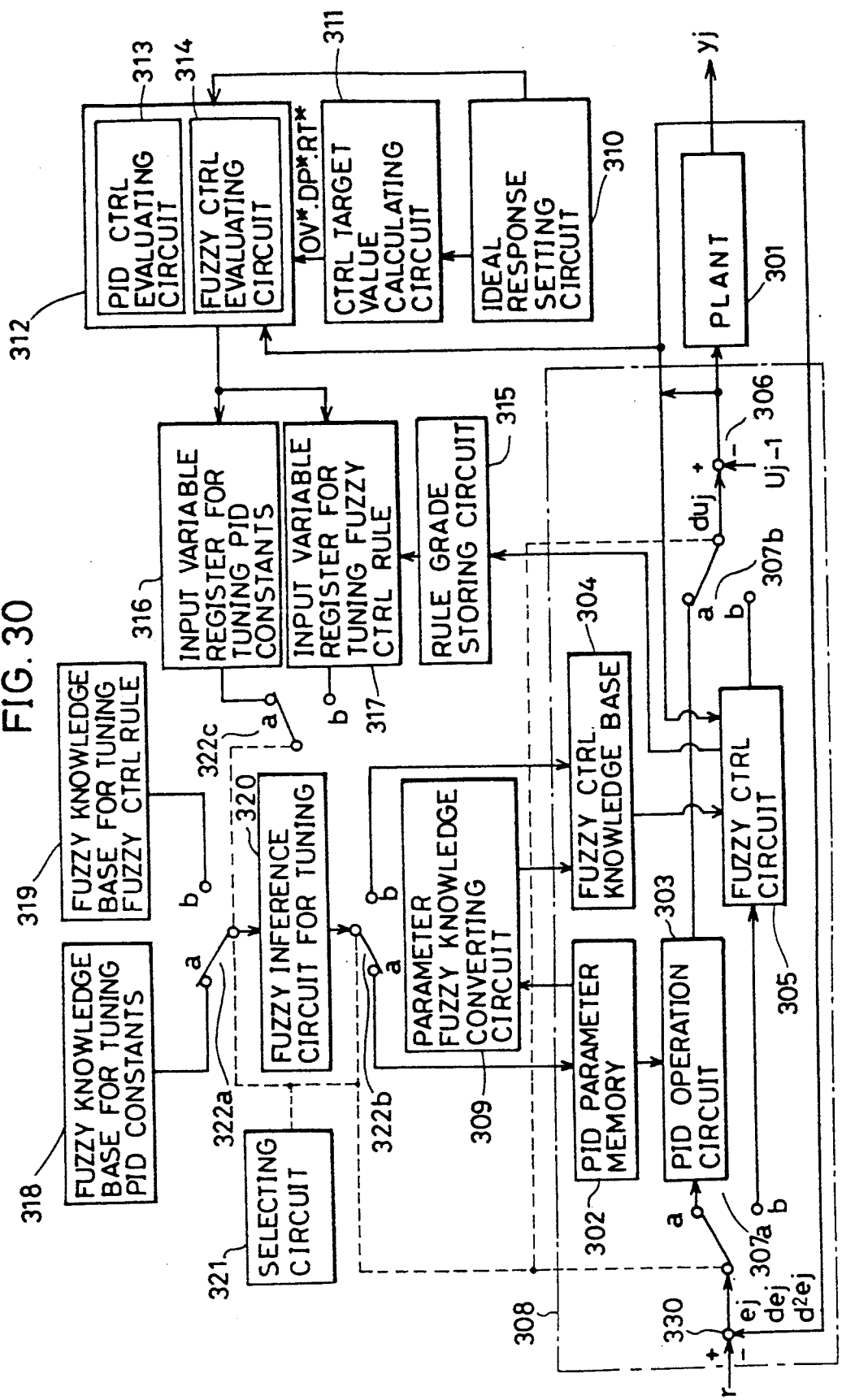
FIG. 30 schematically shows a whole structure of a fuzzy control unit including a fuzzy control knowledge base constructing unit in accordance with a further embodiment of the present invention.

FIG. 30 schematically shows a whole structure of a fuzzy control unit including a fuzzy knowledge constructing unit in accordance with another embodiment of the present invention.

Referring to FIG. 30, the fuzzy control unit 308 comprises a PID parameters memory 302, a PID operation circuit 303, a fuzzy control knowledge base 304, calculators 306 and 330, and switching circuits 307a and 307b.

The PID parameter memory 302 stores PID parameters which are necessary for PID-control of a plant 301, and it corresponds to the PID constant storing circuit 211 of FIG. 19 or a parameter register 101 of FIG. 15.

The PID operation circuit 303 outputs a primary difference $du_j$ of a manipulated variable u, from the control deviation $e_j$ between the set value r and the control response $y_j$ from the plant 301, in accordance with the PID parameters stored in the PID parameter memory 302. The PID operation circuit 303 corresponds to the PID calculating unit 123 of FIG. 16 or the PID operation circuit 202 of FIG. 19.

The fuzzy control knowledge base 304 corresponds to the fuzzy knowledge base 2 of FIG. 1 or the fuzzy knowledge base 107 of FIG. 15, which stores fuzzy knowledge (fuzzy rules and membership functions) necessary for fuzzy control of the plant 301.

The fuzzy control circuit 305 corresponds to the fuzzy inference unit 3 shown in FIG. 1 or fuzzy inference unit 141 shown in FIG. 18, which carries out fuzzy inference in accordance with the fuzzy knowledge stored in the fuzzy knowledge base 304 using the control deviation $e_j$ and primary difference (differential) $de_j$ thereof from the calculator 330 as input variables, to output primary difference $du_j$ of the manipulated variable $u_j$.

The switching circuits 307a and 307b set control operation of the plant 301 to PID control or fuzzy control.

The calculator 306 adds primary difference $du_j$ from the PID operation circuit 303 or from the fuzzy control circuit 305 to the manipulated variable $u_{j-1}$ at the last sampling time to calculate the manipulated variable $U_j$ at present, and applies the same to the plant 301. The calculator 306 corresponds to the integrator 125 shown in FIGS. 16 and 18.

The fuzzy knowledge constructing unit includes a parameter-fuzzy knowledge converting circuit 309 for generating fuzzy knowledge based on the PID parameters stored in the PID parameter memory 302. The parameter-fuzzy knowledge converting circuit 309 includes the division information register 102, input variable dividing circuit 104, the fuzzy rule generating circuit 05 and the hyperplane feedback rule generating unit 106 shown in FIG. 15. The parameter register 101 of FIG. 15 corresponds to the PID parameter memory 302 of FIG. 30. The fuzzy knowledge generated in the parameter-fuzzy knowledge converting circuit 309 is stored in the fuzzy control knowledge base 304.

The knowledge base constructing unit further includes and ideal response setting circuit 310, a control target value calculating circuit 311 and a control evaluating unit 312. The ideal response setting circuit 310 stores the ideal control response $y_j^0$ of the plant 301 in a form of a waveform or in a series of discrete values. The stored contents in the ideal response setting circuit 310 are the same as those shown in FIG. 4, and appropriate values or a waveform is input by an input means (corresponding to the input circuit of FIG. 19), not shown. The ideal response setting circuit 310 corresponds to the ideal response waveform storing table 8 shown in FIG. 1.

The control target value calculating circuit 311 calculates characteristic variables such as the amount of overshoot, amplitude attenuation ratio (dumping ratio) and the reaching time, from the ideal control response waveform set in the ideal response setting circuit 310, and this circuit corresponds to the control target value calculating circuit 204 shown in FIG. 19. If the characteristic variables (control target values) are directly set in the ideal response setting circuit 310, the control target values are not calculated by the control target value calculating circuit 311.

The control evaluating unit 310 includes a PID control evaluating circuit 313 and a fuzzy control evaluating circuit 314. The PID control evaluating circuit 313 corresponds to the control evaluating circuit 207 of FIG. 19, which calculates the characteristic variables from the control response $y_j$, and finds and outputs the control target deviation from the calculated characteristic variables and the corresponding control target values.

The fuzzy control evaluating circuit 314 corresponds to a calculating portion of the control operation evaluating unit 9 shown in FIG. 1, and it calculates variables $e_j^0$ and $de_j^0$ ($=e_j^0-e_{j-s}^0$) from the control response $y_j$ and the ideal control response $y_j^0$.

The fuzzy knowledge constructing unit further includes a rule grade storing circuit 315, an input variable register 316 for tuning PID constants (parameters), and an input variable register 317 for tuning fuzzy control rules. The rule grade storing circuit 315 corresponds to the storing table 6 of FIG. 1, which stores rule grade data from sample time (j−s) to sample time j. The rule grades are calculated by the fuzzy control circuit 305. The stored contents in the rule grade storing circuit 315 are the same as those shown in FIG. 2.

The input variable register 316 stores the control target deviation from the PID control evaluating circuit 313. The input variable register 317 stores the outputs $e_j^0$ and $de_j^0$ from the fuzzy control evaluating circuit 314 and the rule grades applied as needed from the rule grade storing circuit 315.

The fuzzy knowledge base constructing unit further includes a fuzzy knowledge base 318 for tuning PID constants (parameters), storing fuzzy knowledge for tuning PID parameters; a fuzzy knowledge base 319 for tuning fuzzy control rules storing fuzzy knowledge for tuning fuzzy control rules; and a fuzzy inference circuit 320 for tuning, for correcting PID parameters in the PID parameter memory 302 or the fuzzy control rules in the fuzzy control knowledge base 304 based on the fuzzy knowledge either in the fuzzy knowledge base 318 or 319.

The fuzzy knowledge base 318 for tuning PID constants corresponds to the fuzzy knowledge base for tuning shown in FIG. 19, while the fuzzy knowledge base 319 for tuning fuzzy control rules corresponds to the fuzzy knowledge base 10 for tuning shown in FIG. 1. The fuzzy inference circuit 320 for tuning corresponds to the fuzzy inference unit 11 for tuning shown in FIG. 1 or to the fuzzy inference circuit 209 shown in FIG. 19.

Selection of the PID parameter tuning operation and the fuzzy control rule tuning operation is done by switching nodes of switch circuits 307a, 307b, 322a, 322b and 322c by an output from a selecting circuit 321. The setting of selecting modes in the selecting circuit 321 is done by selecting modes in the selecting circuit 321 is done by setting means, not shown.

Fuzzy knowledge (membership functions and fuzzy rules) shown in FIGS. 22 to 28 is stored in the fuzzy knowledge base 318 for tuning PID parameters, and fuzzy knowledge shown in FIGS. 9 to 11 and FIG. 13 or FIG. 14 is stored in the fuzzy knowledge base 319 for tuning fuzzy control rules.

For tuning PID parameters stored in the PID parameter memory 302, the nodes of the switch circuit 307a, 307b, 322a, 322b and 322c are all set to node a, under control of the selecting circuit 321. In this state, the plant 301 is controlled by an output from the PID calculating circuit 303. In the similar manner as the PID parameter tuning action described with reference to FIG. 19, the PID parameters P, $T_I$ and $T_D$ or $K_P$, $K_I$ and $K_D$ in the PID parameter memory 302 are optimized. Any PID parameter may be used. The tuning of the PID parameters is the same as the tuning operation of a set of parameters in the unit shown in FIG. 19, so that the description thereof is not repeated.

When optimized PID parameters $P^*$, $T_I^*$ and $T_D^*$ (or $K_P^*$, $K_I^*$ and $K_D^*$) are stored in the PID parameter memory, then the fuzzy control knowledge is generated by a parameter·fuzzy converting circuit 309. The parameter·fuzzy converting circuit 309 includes unit components 102, 104, 105 and 106 shown in FIG. 15. Therefore, generation of fuzzy knowledge is carried out in the same manner as that described with reference to FIG. 15, and therefore the description thereof is not repeated. The feedback rule generated in the hyperplane feedback rule generating portion is determined corresponding to the PID parameters used.

If the PID parameters are P, $T_I$ and $T_D$, since $$u(t) = (100/P)\left\{ e(t) + (1/T_I)\int_{t_0}^{t} e(t)dt + T_D(de(t)/dt) \right\}$$

$$du = ((100/P) \cdot de + (100/P) \cdot (1/T_I) \cdot e + (100/P) \cdot T_D \cdot d^2e) \cdot dt$$

and hence $$dU = ((100/P^* \cdot T_I^*) \cdot e + (100/P^*) \cdot de + \qquad (19)$$
$$(100 \cdot T_D^*/p^*) \cdot d^2e) \cdot dt$$
$$= (K_I^* \cdot e + K_P^* \cdot de + K_D^* \cdot d^2e) \cdot dt \qquad (19')$$

The fuzzy knowledge generated by the parameter fuzzy knowledge converting circuit 309 based on the optimized PID parameters $P^*$, $T_I^*$ and $T_D^*$ (or $K_P^*$, $K_I^*$, $K_D^*$) is applied to the fuzzy control knowledge base 304 to be stored therein. When the PI control system or PD control system is used instead of the PID control system, the following hyperplane feedback rule $$du = (K_I^* \cdot e + K_P^* \cdot de) \cdot dt$$
$$= ((100/P^* \cdot T_I^*) \cdot e + (100/P^*) \cdot de) \cdot dt$$

or $$du = (K_P^* \cdot de + K_D^* \cdot d^2e) \cdot dt$$
$$= ((100/P^*) \cdot de + (100 \cdot T_D^*/P^*) \cdot d^2e) \cdot dt$$

is used.

Then, the fuzzy knowledge stored as the initial knowledge in the fuzzy control knowledge base 304 is tuned. For tuning this fuzzy control knowledge, the switching circuits 307a, 307b, 322a, 322b and 322c have their nodes switched to node b under control of the switching circuit 321. The tuning operation of the fuzzy control knowledge is the same as the tuning operation described with reference to FIG. 1, so that the description thereof is not repeated.

By the fuzzy knowledge base constructing unit of the fuzzy control unit shown in FIG. 30, the optimal fuzzy knowledge can be constructed effectively without manual labor, and by the effective tuning, fuzzy knowledge for optimal fuzzy control can be constructed.

In the simplified fuzzy inference, a membership function of the consequent portion is represented by one real number. In the above described embodiments, optimal fuzzy control rule is found by correcting the real number value of the consequent portion in accordance with the fuzzy inference. In order to calculate the optimal value of the real number in the consequent portion, a simplex method known in a mathematical programming method or an optimization theory may be applied. The method of tuning fuzzy control rules in accordance with this simplex method will be described.

FIG. 31 schematically shows a whole structure of a fuzzy control unit including a fuzzy knowledge constructing unit in accordance with further another embodiment of the present invention.

In FIG. 31, components corresponding to the unit components shown in FIG. 30 are denoted by the same reference numerals. In the example shown in FIG. 31, one set of PID parameters are stored. Plural sets of PID parameters corresponding to the control targets may be stored.

Referring to FIG. 31, the fuzzy knowledge base constructing unit comprises a tuning fuzzy inference circuit 415 for correcting PID parameters stored in the PID parameter memory 302 by carrying out fuzzy inference using the control target deviation outputted from the control evaluating circuit 312 as an input variable, based on the fuzzy knowledge stored in the fuzzy knowledge base 318 for tuning PID constants (parameters); and a circuit 413 for correcting parameters in the consequent portion of the fuzzy control rule for evaluating control response in accordance with deviation area and settling time calculated by the control evaluating circuit 312 using the ideal response set in the ideal response setting circuit 310 as a reference, and for correcting the value in the consequent portion of the fuzzy control rule in the fuzzy knowledge base 304 in accordance with the simplex method, based on the real number value of the consequent portion in the knowledge base 304.

The correcting circuit 413 executes operations according to a simplex method in which a simplex having vertices found based on values of the consequent portions of fuzzy control rules stored in the knowledge base 304 is found, and further a reflection point to the worst point of the resulting simplex is calculated, so as to find the optimal value (converged solution). The deviation area is provided by the following equation (20).

$$F = \int_0^\infty e(t)^2 \, dt \tag{20}$$

or $$F = \int_0^{Tst} e(t)^2 \, dt \tag{20'}$$

where Tst is settling time.

The settling time Tst is the time required for a control variable (control response) to be settled in a specified range in a step response.

The tuning of the PID parameters, optimizing operation, and the operation of acquiring fuzzy control rules based on the optimized PID parameters in the fuzzy knowledge base constructing unit shown in FIG. 31 are the same as those of the unit shown in FIG. 30, so that the description thereof is not repeated.

When the fuzzy control knowledge is set in the fuzzy control knowledge base 304, the nodes of the switch circuits 307a and 307b are switched from the point a to the point b under the control of the selecting circuit 416, and tuning of the fuzzy knowledge in the fuzzy control knowledge base 304 is done by the correcting circuit 413.

The simplex method will be described. The simplex method is disclosed in, for example, Kiyotaka Shimizu, theory of *system optimization*, Coronasha, July 1976, pp. 92 to 101, and in a text of "System and Control Information: Tutorial Lecture '89" of Japanese System Information Institutes, issued 1989, pp. 179 to 184.

A simplex means a geometrical figure having (n+1) or more points as vertices in an n dimensional space. A simplex method is a searching method based on the concept that of the vertices in the simplex, a reflection point of a worst point for an objective function value with respect to the center of remaining vertices is expected to improve the objective function value. The simplex method repeats the process for calculating the reflection point to research and find the minimum solution. The objective function value is, in this embodiment, an evaluation reference to bring the control response near to the ideal response. The smaller the objective function value, the more control approximates the ideal response.

A simplex having m vertices in an n dimensional space X under constraints is represented as n-dimensional space X: $X = (X_1, X_2 \ldots, X_n)$ constraints: $V_i \leq X_i \leq Z_i$ (21)

i = 1 to n, $V_i$, $Z_i$ are constants, a vertex $X_k$ of the simplex is represented as $$X_k = (X_1^k, X_2^k, \ldots, X_n^k) \tag{22}$$

k = 1 to m and the objective function at the vertex $X_k$ is represented by the following equation (23).

$$Q_k = Q(X_k) \tag{23}$$

In the simplex method, the following steps are carried out. (a) A vertex $X_w$ providing the maximum value (worst point) of respective objective function values $Q_1, \ldots Q_m$ of m vertices is founded out.

(b) A reflection point $X_w'$ with respect to the center of the remaining vertices, of the vertex $X_w$ having the maximum value is calculated. The reflection point $X_w'$ is provided in accordance with the following equation (24).

$$X_w' = X_g + \alpha(X_g - X_w) \tag{24}$$

$$X_g = (1/(m-1)) \sum_{k=1, k \neq W}^{m} X_k$$

The character $\alpha$ represents a weight coefficient appropriately determined to obtain the reflection point $X_w'$, and $X_g$ represents the center of the remaining vertices except the vertex $X_w$.

Figure 32:
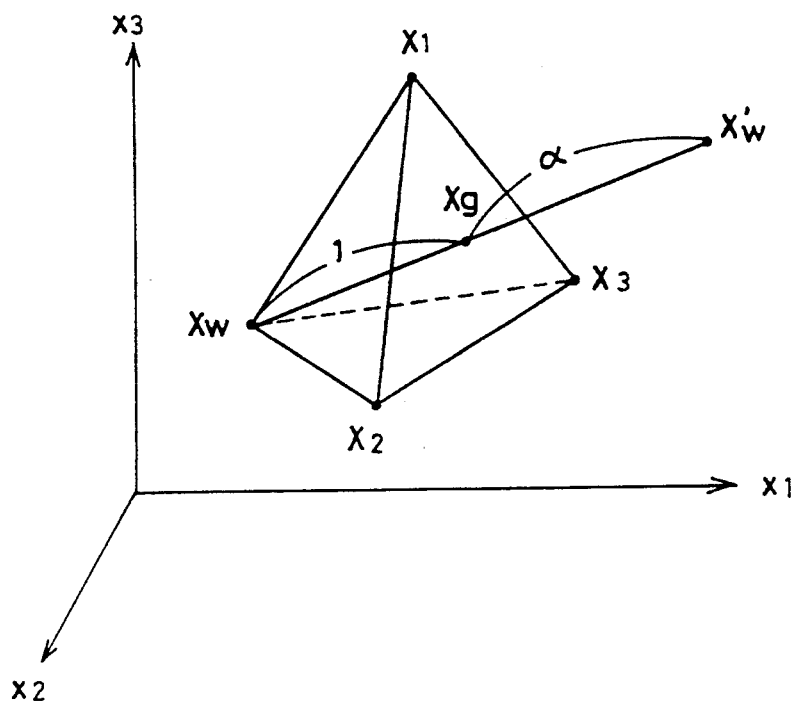
FIG. 32 illustrates a relation between the worst point and a reflection point in the simplex method used in the unit shown in FIG. 31.

FIG. 32 illustrates a relation between the worst point $X_w$ and the reflection point $X_w'$ thereof, where n=3 and m=4. The vertex $X_g$ is the center of three vertices $X_1$, $X_2$ and $X_3$ except the vertex $X_w$. The reflection point $X_w'$ is a reflection of the worst point $X_w$ about the center point $X_g$. Namely, the reflection point $X_w'$ externally divides a segment $X_w X_g$ the ratio of $(1+\alpha):\alpha$.

The searching operation in the simplex method is realized by repeating adjustment of the weight coefficient $\alpha$ such that the objective function value $Q(X_w')$ at the reflection point $X_w'$ set in accordance with the above equation (24) becomes smaller than the objective function value $Q(X_w)$ at the worst point $X_w$.

For example, if the objective function value $Q(X_w)$ at the vertex $X_w$ and the objective function value $Q(X_w')$ at the reflection point $X_x'$ have the relation as $$Q(X_w') << Q(X_w),$$

then the objective function value is still expected to be improved. In this condition, the weight coefficient $\alpha$ is increased to set a new reflection point, and an objective function value at this new reflection point is generated.

If thus set reflection point does not satisfy the constraints $$V_i \leq X_i \leq Z_i, \ i=1 \text{ to } n$$

of the n dimensional space X, then the reflection point is reset to satisfy the constraints, that is, it is reset in a conditioned limited space. The adjustment of the weight coefficient $\alpha$ may be done by successively selecting value from previously set values, or the coefficient may be generated according to the difference between the function values $Q(X_w)$ and $Q(X_w')$. The weight coefficient $\alpha$ at the time of resetting may be calculated by multiplying the last weight coefficient by a prescribed factor, or an appropriate constance value may be used therefor.

For a new simplex including m vertices excluding the worst point but including the reflection point of the worst point, a worst point and a reflection point are again calculated. By repeating this operation, the objective function values $Q(X_k)$ provided by m vertices $X_k$ all converge to a minimum value.

Figure 33:
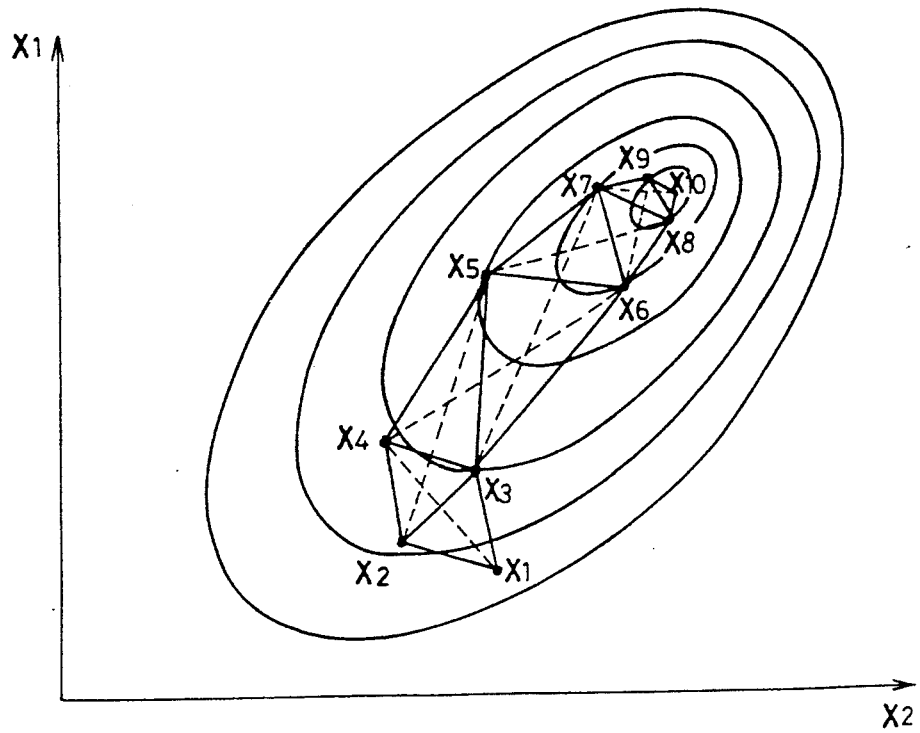
FIG. 33 is a diagram for illustrating the simplex method.

FIG. 33 shows the manner of convergence of the respective vertices in the simplex where n=2 and m=3. In FIG. 33, a simplex having points X1, X2 and X3 as vertices is provided as an initial state. In FIG. 33, an elliptical curve represents a contour line of an objective function value, and outer elliptical curve represents larger objective function value.

In the initial state simplex, the vertex X1 is the worst point, and the reflection point X4 thereof is calculated. Next, in a simplex including vertices X2, X3 and X4, the reflection point (the exterior division point) X5 of the worst point X2 is calculated. By repeating this operation, a simplex including vertices X8, X9 and X10 is provided finally. The correspondence between the worst point and a reflection point thereof in the respective simplexes are shown by dotted lines in FIG. 33.

The searching operation is completed when the standard deviation of the evaluation value (objective function value) of each vertex of the provided simplex becomes smaller than a predetermined threshold value $\xi$ as represented by the following equation (25

$$\left[ (1/m) \sum_{k=1}^{m} (Q_k - Q)^2 \right]^{\frac{1}{2}} < \xi, \tag{25}$$

$$Q = (1/m) \sum_{k=1}^{m} Q_k$$

The circuit 413 for correcting parameters in the fuzzy control rule consequent portion shown in FIG. 31 corrects the values of the real numbers (parameters) of the consequent portion of the fuzzy control rules store in the fuzzy knowledge base 304 in accordance with the above described simplex method.

The correcting circuit 413 defines initial parameters of vertices $X_k$ constituting the simplex as follows.

$$X_k = (dh_1^k, dh_2^k, \ldots dh_n^k) \tag{26}$$

$$k = 1, 2 \ldots, n, n+1, \ldots m$$

where $dh_i^k$: value (real number value) of the consequent portion of the fuzzy control rule n: number of rules (number of fuzzy control rules) of the fuzzy control rules in the fuzzy control knowledge base 304 m: number of vertices constituting the simplex, with $m \geq n+1$.

Figure 34:
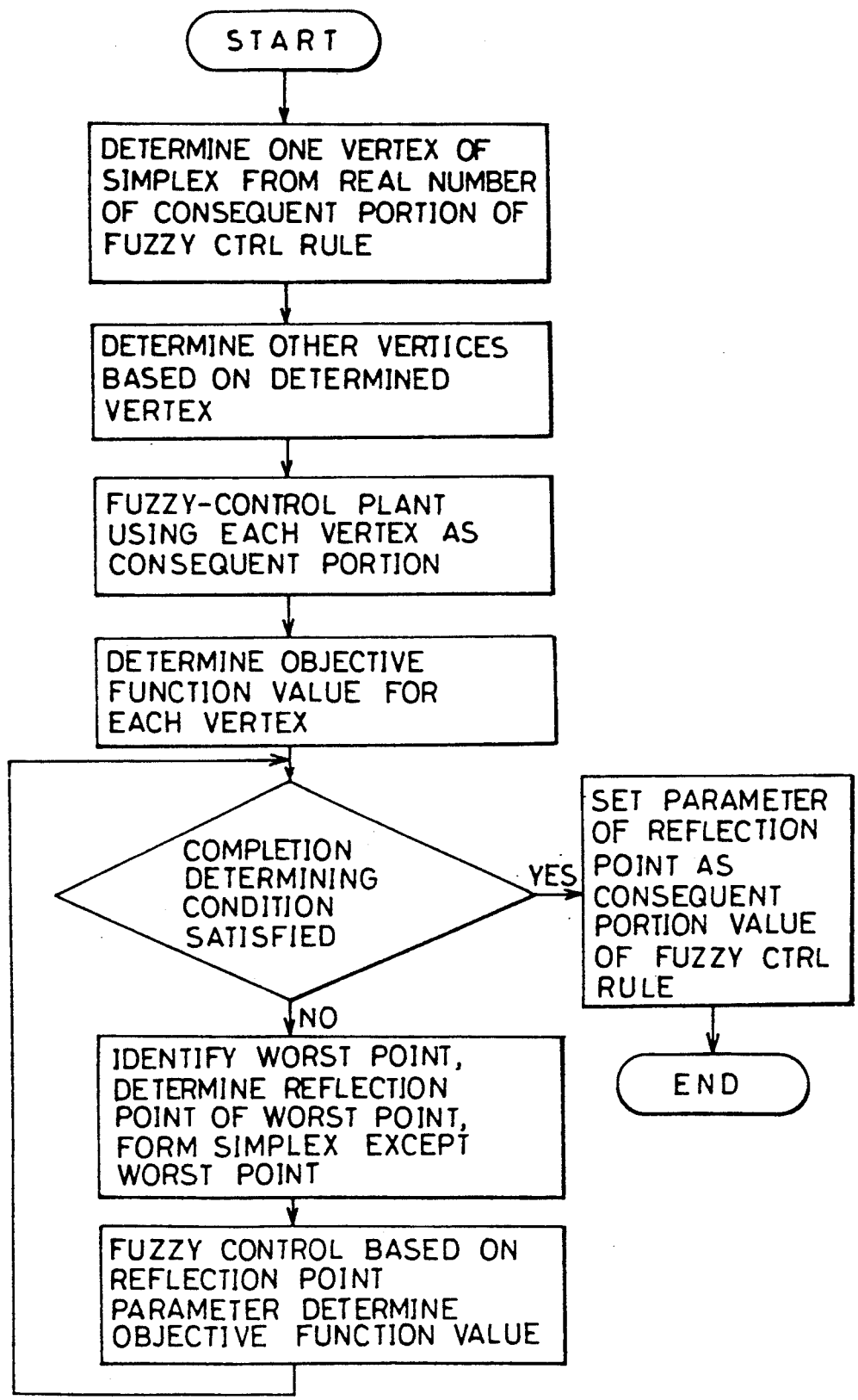
FIG. 34 is a flow chart showing the operation of the consequent portion parameter correcting circuit shown in FIG. 31.

If the fuzzy control rules shown in FIG. 6 are used for instance, then n=13, and therefore the number m of vertices of the simplex is 14 or more. In this example, m=14. The operation of the correcting circuit 413 will be described with reference to the operational flow chart of FIG. 34.

When correction of the values (parameters: real numbers) of the consequent portion is to be executed, the correcting circuit 413 first sets vertices constituting the simplex. More specifically, the fuzzy control rule consequent portion parameter correcting circuit 413 sets points determined by values of consequent portions of the fuzzy control rules generated by converting the PID parameters in the parameter fuzzy knowledge converting circuit 309, as vertices of the simplex. Namely, vertices of the simplex are set by using respective real numbers of the fuzzy control rule consequent portions initially set in the fuzzy control knowledge base 304 as parameters. By doing so, one vertex is set.

Further the remaining vertices are set by the following procedures:

(a) one point set by the values of the consequent portion of the fuzzy control rules is used as a base. More specifically, respective parameters of an already provided one vertex are used as a base;

(b) respective parameters of the new vertex are set by using the parameters of the vertex used as the base and random numbers generated from a random number generator, not shown. The method will be described in detail.

The values of the consequent portion of the fuzzy control rules generated in the parameter fuzzy knowledge converting circuit 309 are provided as $$dh = (dh_1, dh_2, dh_3, \ldots dh_{13}).$$

The first vertex $X_1$ of the simplex is provided by using these values, as $$X_1 = (dh_1^1, dh_2^1, dh_3^1, \ldots dh_{13}^1).$$

The parameter $dh_i^k$ forming the remaining vertices $X_k$ (k=2 to 14) are provided by the following equation (27).

$$dh_i^k = dh_i^1 + \theta \cdot MIN\{dh_i^1 - V_i, Z_i - dh_i^1\} \quad (27)$$

where
k=2, ..., 14,
i=1, ..., 13,
$\theta$; a uniform random number within the range of [−1, 1]
$V_i, Z_i$: constraints for $dh_i$; the lower and upper limits of $dh_i$
MIN {,}: a function taking the minimum value in {,}.

Namely, the parameter $dh_i^k$ is set in a range not exceeding the constraints $v_i \leq dh_i \leq z_i$ with the parameter $dh_i^1$ serving as the base being the center. The values $v_i$ and $z_i$ defining the constraints determine the range of a real number value (that is, output variable of the fuzzy control rule) of the consequent portion.

The correcting circuit 413 sets the parameters of the respective vertices of thus set simplex in the fuzzy knowledge base 304 as values of the consequent portions of the fuzzy control rules for each of the vertices. The fuzzy control circuit 305 generates a primary differential (difference) $du_j$ of the manipulated variable $u_j$ in accordance with the fuzzy knowledge set in the fuzzy knowledge base 304.

Now, there are 14 vertices in the simplex, fuzzy control of the plant 301 is carried out independently by the fuzzy control rules in accordance with the parameters of respective vertices $X_k$ (k=1 to 14). Namely, 14 times of fuzzy control is executed by one simplex.

The control evaluating circuit 312 generates objective function values such as deviation area or deviation squared area from the control response $y_j$ from the plant and from the ideal response value $y_j^0$ set in the ideal response setting circuit 310 to output the same to the correcting circuit 413. One type of objective function values are previously selected corresponding to the plant, out of the objective function types provided by the control characteristic variables.

Since the objective function value is provided by a deviation area or a deviation squared area and not a response deviation, comparison between the control response $y_j$ and the ideal response value $y_j^0$ at every sample time from the start of control to the end of control is effected in one control cycle, in the evaluating circuit 312.

The deviation of the objective function value is applied from the control evaluating circuit 312 to the correcting circuit 304.

The correcting circuit 413 calculates the worst point $X_w$ of the 14 vertices of the simplex in accordance with the received objective function value, and then calculates the reflection point $X_x'$ in accordance with the equation (24). Parameters of the reflection point $X_w'$ are stored in the fuzzy control knowledge base 304 as values of the consequent portion of the fuzzy control rules. At this time, parameters of the reflection point $X_w'$ are stored instead of the worst point $X_w$, in the correcting circuit 413. As to the vertices $X_k$ except the worst point, objective function values provided corresponding thereto are stored.

The fuzzy control unit 305 carries out fuzzy control of the plant 301 in accordance with the fuzzy control rules set based on respective parameters of the reflection point. Receiving the objective function value corresponding to the reflection point, the correcting circuit 413 again determines the worst point and calculates the reflection point.

The above described operation is repeated until the standard deviation of each evaluated value (objective function value) of each of the newest 14 vertices including the reflection point becomes not greater than the prescribed value $\xi$ (see equation (25)). The determination of comparison is done in the correcting circuit 413.

If the condition for determining completion represented by the equation (25) is satisfied, tuning of the fuzzy knowledge in the fuzzy control knowledge base 304 is completed at the time. At this time, a fuzzy control rules with the values of the consequent portion being the parameters of the latest reflection point is stored in the fuzzy control knowledge base 304.

When tuning of the fuzzy control rules is carried out by using the simplex method, deviation area or deviation squared area is used as the control objective value, so that precise tuning of fuzzy control rules can be executed only by inputting an ideal response waveform.

As described above, according to the present invention, tuning of fuzzy control rules can be easily and precisely carried out dependent on the state of control of the plant to be controlled.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tuning unit for a fuzzy control unit controlling a plant to be controlled based on fuzzy control knowledge including membership functions and fuzzy control rules such that a control response value applied to said plant is made equal to a predetermined target value, said tuning unit being for correcting said fuzzy control knowledge and comprising:

ideal response waveform storing means for storing a sequence of ideal response values which are desired outputs of said plant to be controlled;
response waveform storing means for storing a sequence of control response values from said plant to be controlled;
rule grade storing means for storing a grade value of the fuzzy control rules included in said fuzzy control knowledge with respect to each said control response value from said plant to be controlled;
control evaluating means for calculating from an ideal response valued stored in said ideal response waveform storing means and from a control response value stored in said response waveform storing means, a response deviation indicating a difference between said ideal response value and a corresponding control response value, and an amount of change of a response deviation indicating magnitude of change of the response deviation in a predetermined period;
means for storing tuning fuzzy knowledge including membership functions and fuzzy rules for correcting the membership function in a consequent portion of said fuzzy control rules in said fuzzy control knowledge, according to respective magnitudes of said response deviation and the amount of change in said response deviation; and
correcting means responsive to the response deviation information and the amount of change of the response deviation calculated by said control evaluating means and to rule grade information from said rule grade storing means, for correcting the membership functions of said consequent portion of said fuzzy control rules of effecting a predetermined calculation in accordance with said tuning fuzzy knowledge.

2. A tuning unit according to claim 1, wherein
each said membership function of said consequent portion of said fuzzy control rules is represented by one real number $h_i$.

3. A tuning unit according to claim 2, wherein
each said membership function of the consequent portion of said tuning fuzzy knowledge is represented by one real number $P_i$; and
said correcting means includes
first means for calculating a basic amount of correction $\Delta h_i$ with respect to the real number $h_i$ of said consequent portion of said fuzzy control rule in accordance with $$\Delta h_i = \sum_{K=1}^{m} \mu_K \cdot P_K / \sum_{K=1}^{m} \mu_K$$

using said response deviation and said amount of change of the response deviation from said control evaluating means as input variables; and
second means receiving said basic amount of correction $\Delta h_i$ calculated by said first means and the rule grade information from said rule grade storing means, for calculating a corrected value of the real number $h_i$ of said consequent portion of said fuzzy control rules in accordance with an equation of $$h_i^{NEW} = h_i^{OLD} + W_i^{(j-s)} \cdot \Delta h_i$$

where m: total number of rules of the tuning fuzzy knowledge,
$P_k$: real number of the consequent portion of the tuning fuzzy knowledge,
$\mu_k$: grade value of k-th fuzzy rule of the tuning fuzzy knowledge when the response deviation and the amount of change of the response deviation at sample time j are applied,
$W_i^{(j-s)}$: grade value of i-th fuzzy control rule in the fuzzy control knowledge used at sample time $(j-s)$,
$h_i^{OLD}$: a value of a consequent portion of the i-th fuzzy control rule in the fuzzy control knowledge base used at the sample time $(j-s)$, and
$h_i^{NEW}$: a value of the consequent portion of the i-th fuzzy control rule corrected at the sample time j.

4. A tuning unit according to claim 1, further comprising:
parameter storing means for storing at least one parameter out of PID parameters including a proportional parameter, an integral parameter and a differential parameter for controlling said plant to be controlled in accordance with a PID control action including proportional, integral and differential control actions;
division information storing means for storing a range of input variables at an antecedent portion of said fuzzy control rules in said fuzzy control knowledge base and information indicating the number of divisions in the range;
input variable dividing means for fuzzy-dividing said input variables of said fuzzy knowledge in said fuzzy control knowledge base in accordance with the information of said range and said number of divisions stored in said division information storing means, and for generating a membership function with respect to said input variable corresponding to the fuzzy division;
fuzzy rule generating means for generating fuzzy control rules by determining a consequent portion of said fuzzy control rules in said fuzzy control knowledge in accordance with a selected representative values of each said divided region generated by said input variable dividing means and with values of the parameter stored in said parameter storing means; and
means for transferring the membership functions generated by said input variable dividing means and the fuzzy control rules generated by said fuzzy rule generating means as initial fuzzy control knowledge to said fuzzy control knowledge base.

5. A tuning unit according to claim 4, wherein
said fuzzy rule generating means includes means for selecting an input variable value as said selected representative value, at which a corresponding membership function value attains to 1.

6. A tuning unit according to claim 4, wherein
said fuzzy rule generating means includes means for determining the real number value of the consequent portion of said fuzzy control rules in said fuzzy control knowledge based on said selected representative value and the parameters stored in said parameter storing means in accordance with a hyperplane feedback rule, the membership function at the consequent portion of said fuzzy control rule represented by one real number providing a membership value of 1.

7. A tuning unit according to claim 4, further comprising:
   arithmetic operation controlling means responsive to a control response from said plant to be controlled and to a predetermined target value for carrying out an arithmetic operation based on a control parameter stored in said parameter storing means, and for controlling said plant to be controlled in accordance with a result of said arithmetic operation;
   second control target value generating means for generating control target values to be attained by said control response from said plant to be controlled;
   second control evaluating means for calculating characteristic variables for evaluating control from said control response from said plant to be controlled, and for outputting a control target deviation provided as a function of difference between the calculated characteristic variable and said control target value;
   fuzzy knowledge for tuning parameters storage means for storing fuzzy knowledge for correcting said control parameter in accordance with said control target deviation; and
   parameter correcting means for effecting fuzzy inference in accordance with the fuzzy knowledge stored in said fuzzy knowledge for tuning parameters storage means, using said control target deviation from said second control evaluating means as input variables, and for correcting the control parameters stored in said parameter storing means in accordance with a result of the fuzzy inference.

8. A tuning unit according to claim 7, wherein said control target value generating means includes:
   input means for applying ideal control response information to be attained by said plant under control of said arithmetic operation controlling means; and
   control target value calculating means for calculating said control target value from the ideal control response information applied from said input means for applying thus calculated control target value to said second control evaluating means.

9. A tuning unit according to claim 7, wherein said control target value generating means includes:
   input means for providing said control target value;
   control target value storage means for storing the control target values from said input means; and
   control target value transferring means for transferring the controlled target values stored in said control target value storage means to said second control evaluating means.

10. A tuning unit for a fuzzy control unit controlling a plant such that a control response value from said plant is made equal to a predetermined target value, based on fuzzy control knowledge including membership functions and a fuzzy control rules, said a tuning unit being for correcting said fuzzy control rules and comprising:
    control target value setting means for setting a control target value to be realized by a control response from said plant to be controlled;
    control evaluating means for calculating characteristic variables to evaluate control operation of said plant to be controlled from the control response from the plant to be controlled, and for generating a control target deviation indicating a difference between thus calculated characteristic variable and the control target value set by said control target value setting means; and
    fuzzy knowledge correcting means responsive to the control target deviation from said control evaluating means for correcting said fuzzy control rule in said fuzzy control knowledge in accordance with a simplex method.

11. A tuning unit according to claim 10, wherein said control target value setting means comprises:
    ideal response waveform storage means for storing an ideal response waveform to be attained by said plant to be controlled; and
    control target value calculating means for calculating said control target values from said ideal response waveform to apply the same to said control evaluating means.

12. A tuning unit according to claim 10, wherein each label of a consequent portion of said fuzzy control rule in said fuzzy control knowledge is represented by one real number, and
    said fuzzy knowledge correcting means includes means for forming one vertex of a simplex from the real numbers of the consequent portion of said fuzzy control rules, and
    means for forming remaining vertices of said simplex from thus formed one vertex, said remaining vertices being selected to exist in a predetermined range.

13. A tuning unit according to claim 10, further comprising:
    parameter storage means for storing at least one control parameter of PID parameters including a proportional parameter, an integral parameter and a differential parameter for controlling said plant to be controlled in accordance with PID control operation including proportional operation, integral operation and differential operation;
    converting means for generating said fuzzy control knowledge based on the parameter stored in said parameter storing means; and
    transmitting means for transmitting the generated fuzzy control knowledge to said fuzzy control knowledge base to be stored therein.

14. A tuning unit according to claim 13, wherein said converting means includes:
    division information storage means for storing information of a range of an input variable in an antecedent portion of said fuzzy control rules in said fuzzy control knowledge and of the number of divisions of the range;
    input variable dividing means for fuzzy-dividing said input variable range in accordance with said information of the number of divisions and said information of said range stored in said division information storing means and for generating a membership function with respect to said input variable corresponding to each of resulting divisions;
    fuzzy rule generating means for generating said fuzzy control rules by determining the consequent portion of said fuzzy control rules in accordance with a selected representative value of each said division generated by said input variable dividing means and to a value of the parameter stored in said parameter storing means; and
    means for generating the fuzzy control knowledge from the membership functions generated by said input variable dividing means and from the fuzzy control rule generated by said fuzzy rule generating means for transferring the same to said fuzzy control knowledge base.

15. A tuning unit according to claim 14, wherein said fuzzy rule generating means includes means for selecting an input variable value as said selected representative value at which the value of the corresponding membership function attains to 1.

16. A tuning unit according to claim 14, wherein said fuzzy rule generating means includes means for determining a value of the consequent portion of said fuzzy control rule in accordance with a hyperplane feedback rule based on said selected representative value and the parameter stored in said parameter storage means, the membership function of said fuzzy control rule being represented by one real number providing a membership function value of 1.

17. A tuning unit according to claim 13, further comprising:
arithmetic operation controlling means responsive to the control response from said plant to be controlled and to a predetermined target value for carrying out an arithmetic operation based on the control parameter stored in said parameter storage means and for controlling said plant to be controlled in accordance with the result of the arithmetic operation;
fuzzy knowledge for tuning parameters storage means for storing fuzzy knowledge for correcting said control parameter in accordance with said control target deviation from said control evaluating means; and
parameter correcting means for carrying out fuzzy inference in accordance with the fuzzy knowledge stored in the fuzzy knowledge for tuning parameters storage means, using said control target deviation from said control evaluating means as input variables, for correcting the control parameters stored in said parameter storage means in accordance with the result of the fuzzy inference.

18. Apparatus for constructing fuzzy control knowledge for a fuzzy control unit controlling a plant to be controlled such that a control response value from said plant under control is made equal to a predetermined target value by using fuzzy control knowledge base including membership functions and fuzzy control rules, comprising:
parameter storage means for storing at least one control parameter of a proportional parameter, an integral parameter and a differential parameter for controlling said plant to be controlled in accordance with PID operation including proportional operation, integration operation and differential operation;
division information storage means for storing information of a range of an input variable in an antecedent portion of said fuzzy control rules and of the number of divisions of the range;
input variable dividing means for fuzzy-dividing said input variable range of the fuzzy control rules, which is to constitute said fuzzy knowledge, into plural regions in accordance with the information of said the number of divisions and of said range stored in said division information storage means and for generating a membership function of said input variable corresponding to each resultant division;
fuzzy rule generating means for determining a consequent portion of said fuzzy control rule in accordance with a selected representative value of each said fuzzy-divided region generated by said input variable dividing means and to the value of the parameter stored in said parameter storing means for generating the fuzzy control rule; and
fuzzy control knowledge storage means for storing the membership functions generated by said input variable dividing means and the fuzzy rules generated by said fuzzy rule generating means as said fuzzy control knowledge.

19. Apparatus according to claim 8, wherein said fuzzy rule generating means includes means for selecting an input variable value as said selected representative value at which a corresponding membership function value attains to 1.

20. Apparatus according to claim 18, wherein said fuzzy rule generating means includes means for determining said consequent portion of said fuzzy control rule base on said selected representative value and on said control parameter, the membership function of said consequent portion of said fuzzy control rule being represented by one real number value providing a membership value of 1.

21. A PID control unit for controlling a plant to be controlled such that a control response value from said plant to be controlled is made equal to a predetermined target value in accordance with at least one control parameter of a proportional parameter, an integral parameter and a differential parameter indicating proportional operation, integral operation and differential operation, respectively, comprising:
parameter storage means for storing said control parameter;
arithmetic operation controlling means responsive to the control response value from said plant to be controlled and to said predetermined target value for carrying out control arithmetic operation based on the control parameter stored in said parameter storage means and for controlling said plant in accordance with the result of said control arithmetic operation;
target value setting means for setting a control target value which is to be attained by said plant under control of said arithmetic operation controlling means;
control evaluating means for calculating a characteristic variables for evaluating operation of control of said plant to be controlled from the control response value from said plant to be controlled, and for outputting a control target deviation indicating a difference between the calculated characteristic variable and the control target value set by said target value setting means;
a tuning fuzzy knowledge base storage means having control target for storing deviation as tuning input information for tuning said control parameters in response to an amount of said control target deviation;
correcting means for carrying out fuzzy inference in accordance with the fuzzy knowledge stored in said fuzzy knowledge for tuning storage means, using said control target deviation as input variables, and for correcting said control parameters in accordance with the result of the fuzzy inference.

22. A unit according to claim 21, wherein said target value setting means includes:

input means for inputting information of an ideal control response to be attained by said plant to be controlled under control of said arithmetic operation controlling means; and calculating means for calculating said control target value based on the ideal control response information applied by said input means.

23. A unit according to claim 21, wherein
said target value setting means includes:
control target value storage means for storing plural sets of control target values; and control target value selecting means for selecting a set of control target values out of the plural sets of control target values in said control target value storage means in accordance with the control response from said plant to be controlled, and for applying the selected set of control target values to said control evaluating means.

24. A unit according to claim 21, wherein
said control target value setting means includes:
input means for inputting information of an ideal control response to be attained by said plant to be controlled under control of said arithmetic operation controlling means; and calculating means for calculating said control target value from the ideal control response information from said input means and for applying the calculated control target value to said control target value storing means.

25. A unit according to claim 21, wherein
said parameter storage means stores plural sets of control parameters;
said PID control unit further comprising
parameter selecting means for selecting a corresponding set of control parameters from said parameter storage means in accordance with the control response from said plant to be controlled to apply the same to said arithmetic operation controlling means.

26. For a fuzzy control unit controlling a plant such that a control response value from said plant is made equal to a predetermined target value based on a fuzzy control knowledge including membership functions and fuzzy control rules, a method of tuning for correcting said fuzzy control knowledge, comprising the steps of:

storing a sequence of control response values from said plant to be controlled;

storing grade information of fuzzy control rules included in said fuzzy control knowledge corresponding to each said control response value from said plant to be controlled;

calculating, from a stored ideal response value and the stored control response value, a response deviation indicating a difference between said ideal response value and the corresponding control response value, and an amount of change of the response deviation indicating a magnitude of change in the response deviation in a predetermined period; and carrying out a fuzzy inference calculation in accordance with a previously prepared fuzzy knowledge for tuning, in accordance with respective magnitudes of the calculated response deviation and the amount of change of the response deviation and with the stored rule grade information for correcting a membership function in a consequent portion of said fuzzy control rules; wherein said step of correcting includes the step of using tuning fuzzy knowledge for correcting a membership function of a consequent portion of said fuzzy control rules, using said response deviation and said amount of change of the response deviation as antecedent portion input variables.

27. A method according to claim 26, further comprising the steps of:

storing at least one parameter out of PID parameters including a proportional parameter, an integral parameter and a differential parameter for controlling said plant to be controlled in accordance with PID operation including proportional, integral and differential operations;

storing information of a range of input variables of an antecedent portion of said fuzzy control rules and of the number divisions of the range;

fuzzy-dividing the input variable of said fuzzy control knowledge in accordance with the information of said number of divisions and said range, and generating a membership function with respect to said input variable corresponding to each division of the fuzzy division;

generating a fuzzy control rule by determining a consequent portion of said fuzzy control rules in said fuzzy control knowledge in accordance with a selected representative value of each of generated divided regions of the input variables and to a value of the stored parameter; and generating said fuzzy control knowledge by combining thus generated membership functions and thus generated fuzzy control rules.

28. A method according to claim 27, wherein
said step of generating said fuzzy rules includes the step of
selecting an input variable value as said selected representative value at which the value of the corresponding membership function attains to 1.

29. A method according to claim 27, wherein
said step of generating said fuzzy rules includes the step of
determining a real number value of the consequent portion of said fuzzy control rules in said fuzzy control knowledge in accordance with a hyperplane feedback rule based on said selected representative value and on said stored parameter, the membership function of said consequent portion of said fuzzy control rule being represented by one real number providing a membership value of 1.

30. A method according to claim 26, further comprising the steps of:

carrying out an arithmetic operation responsive to the control response from said plant to be controlled and to a predetermined target value, based on said stored parameter, and controlling said plant in accordance with the result of the arithmetic operation;

setting a control target value to be attained by said object to be controlled;

calculating a characteristic variable for evaluating said plant to be controlled from said control response from said plant to be controlled;

outputting a control target deviation applied as a function of a difference between said calculated characteristic variable and said control target value; and carrying out fuzzy inference using said control target deviation as an input variable and correcting said stored parameter in accordance with the result of the inference, said step of correcting the parameter including the step of using fuzzy knowledge for tuning a parameter, for correcting said stored parameter in accordance with said control target deviation.

31. A method according to claim 30, wherein said step of setting said control target value includes the steps of:

applying data of ideal control response to be attained by said plant under control in accordance with said parameter; and calculating said control target value from the applied ideal control response data.

32. A method according to claim 30, wherein said step of setting said control target value includes the steps of:

applying a control target values;

storing thus applied control target values; and reading thus stored control target values.

33. A tuning method for a fuzzy control unit for controlling a plant to be controlled such that a control response value from said plant is made equal to a predetermined target value based on fuzzy control knowledge including membership functions and fuzzy control rules, said tuning method being for correcting said fuzzy control knowledge and comprising the steps of:

setting a control target value to be realized by the control response from said plant to be controlled;

calculating a characteristic variable for evaluating control operation of said plant to be controlled from the control response from said plant to be controlled and generating a control target deviation indicating a difference between thus calculated characteristic variable value and said set control target value; and correcting said fuzzy control rule in said fuzzy control knowledge in accordance with a simplex method in response to said control target deviation.

34. A method according to claim 33, wherein said step of setting said control target value includes the steps of:

storing an ideal response waveform to be attained by said plant to be controlled; and calculating said control target value from said ideal response waveform to apply the same to said control evaluating means.

35. A method according to claim 33, wherein each label of a consequent portion of said fuzzy control rule in said fuzzy control knowledge is represented by one real number, and said step of correcting said fuzzy knowledge includes the steps of forming one vertex of a simplex from the real number values of the consequent portion of said fuzzy control rule, and forming remaining vertices of said simplex from thus formed one vertex, said remaining vertices being selected to exist in a predetermined range.

36. A method according to claim 33, further comprising the steps of:

storing at least one control parameter of PID parameters including a proportional parameter, an integral parameter and a differential parameter for controlling said plant in accordance with PID operation including proportional operation, integral operation and differential operation;

generating fuzzy knowledge to be said fuzzy control knowledge based on said stored control parameter; and storing said generated fuzzy knowledge as said fuzzy control knowledge in a knowledge base.

37. A method according to claim 36, wherein said step of generating said fuzzy knowledge includes the steps of:

storing information of a range of input variables of an antecedent portion of said fuzzy control rules and of the number of divisions of this range;

fuzzy-dividing said input variables in accordance with the stored information of said number of divisions and said information of said range, and generating a membership function for said input variable corresponding to each of resulting divisions; and generating said fuzzy control rule by determining a consequent portion of said fuzzy control rule in accordance with a selected representative value of each of thus generated divisions and to the value of the stored parameter; and generating the fuzzy control knowledge from the membership functions and thus generated fuzzy control rules to transfer the same to said fuzzy control knowledge base.

38. A method according to claim 37, wherein said step of generating said fuzzy rule includes the step of selecting an input variable value as said selected representative value at which the value of the corresponding membership function attains to 1.

39. A method according to claim 37, wherein said step of generating said fuzzy rule includes the step of determining a value of the consequent portion of said fuzzy control rule in accordance with a hyperplane feedback rule based on said selected representative value and on said stored parameter, the membership function of said fuzzy control rule being represented by one real number providing the membership function value of 1.

40. A method according to claim 36, further comprising the steps of:

carrying out an arithmetic operation responsive to the control response from said plant to be controlled and to the previously set target value based on the stored control parameter and controlling said plant to be controlled in accordance with the result of the arithmetic operation; and carrying out fuzzy inference using said control target deviation as an input variable for correcting said stored control parameter, said step of correcting said control parameter including the step of using fuzzy knowledge for tuning parameter, for correcting said stored control parameter in accordance with said control target deviation.

41. A method of constructing fuzzy control knowledge for a fuzzy control unit controlling a plant to be controlled such that a control response value from said plant to be controlled is made equal to a previously set target value by using fuzzy control knowledge including membership functions and fuzzy control rules, comprising the steps of:

storing at least one control parameter out of a proportional parameter, an integral parameter and a differential parameter for controlling said plant to be controlled in accordance with PID operation including proportional operating, integral operation and differential operation;

storing information of a value range of an input variable in an antecedent portion of said fuzzy control rule and of the number of divisions of the value range;

fuzzy-dividing said input variable of said fuzzy control rules which is to constitute said fuzzy knowledge into plural regions in accordance with said stored information of said number of divisions and said range, and generating a membership function of said input variable corresponding to each of resulting divisions;

determining a consequent portion of said fuzzy control rule in accordance with a selected representative value of each of thus generated fuzzy-divided regions and to the value of the stored parameter for generating the fuzzy control rule; and storing thus generated membership functions and thus generated fuzzy rules as said fuzzy control knowledge.

42. A method according to claim 41, wherein said step of generating the fuzzy rule includes the step of selecting an input variable value at which the corresponding membership function value attains to 1 as said selected representative value.

43. A method according to claim 41, wherein said step of generating the fuzzy rule includes the step of determining said consequent portion of said fuzzy control rule based on said selected representative value and said control parameter, the membership function of said consequent portion of said fuzzy control rule being represented only by one real number providing the membership value of 1.

44. A method of PID control for controlling a plant to be controlled such that a control response value from said plant to be controlled is made equal to a previously set target value in accordance with at least one control parameter of a proportional parameter, an integral parameter and a differential parameter indicating proportional operation, integral operation and differential operation, respectively, comprising the steps of:

storing said control parameter;

performing a control arithmetic operation in response to a control response from said plant to be controlled and to the previously set target value based on said stored control parameter and controlling said plant to be controlled in accordance with the result of the control arithmetic operation;

setting a control target value to be attained by said plant under control based on said control arithmetic operation;

calculating a characteristic variable for evaluating state of control of said plant to be controlled, from the control response from said plant to be controlled, and outputting a control target deviation indicating a difference between thus calculated characteristic variable and said set control target value; and carrying out a fuzzy inference using said control target deviation as an input variable for correcting the stored control parameter in accordance with the result of the fuzzy inference, said step of correcting the stored control parameter including the step of using fuzzy knowledge for tuning said control parameter according to said control target deviation.

45. A method according to clam 44, wherein said step of setting the control target value includes the steps of:

inputting information of an ideal control response to be attained by said plant under control through said arithmetic operation; and calculating said control target value from the input information of the ideal control response.

46. A method according to claim 44, wherein said step of setting the control target value includes the steps of:

storing plural sets of control target values; and selecting a set of control target values out of the plural sets of control target values in thus stored control target values in accordance with the control response from said plant to be controlled, and outputting thus selected set of control target values.

47. A method according to claim 44, wherein said step of setting the control target values includes the steps of:

inputting information of an ideal control response to be attained by said plant to be controlled under control through said arithmetic operation; and calculating and finding said control target value from the input information of the ideal control response.

48. A method according to claim 44, wherein said step of storing the control parameter includes the step of storing plural sets of control parameters, said method of PID control further comprising the step of selecting a set of control parameters for said control arithmetic operation, out of said stored plural sets of control parameters in accordance with the control response from said plant to be controlled.

* * * * *